(12) United States Patent
Olson

(10) Patent No.: US 12,304,757 B2
(45) Date of Patent: *May 20, 2025

(54) SWEEP AUGER DRIVE SHIELD WITH GRAVITY RECLAIM

(71) Applicant: Sukup Manufacturing Co., Sheffield, IA (US)

(72) Inventor: Ryan Thomas Olson, Dows, IA (US)

(73) Assignee: SUKUP MANUFACTURING CO., Sheffield, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/331,524

(22) Filed: Jun. 8, 2023

(65) Prior Publication Data

US 2024/0124252 A1 Apr. 18, 2024

Related U.S. Application Data

(63) Continuation of application No. 17/862,474, filed on Jul. 12, 2022, now Pat. No. 11,708,227, which is a
(Continued)

(51) Int. Cl.
*B65G 65/46* (2006.01)
*A01F 25/20* (2006.01)
*B65G 65/48* (2006.01)

(52) U.S. Cl.
CPC ........ *B65G 65/466* (2013.01); *A01F 25/2018* (2013.01); *B65G 65/4836* (2013.01)

(58) Field of Classification Search
CPC ..... A01F 25/2018; B65G 33/10; B65G 33/18; B65G 65/466; B65G 65/4836
(Continued)

(56) References Cited

U.S. PATENT DOCUMENTS 2,998,123 A    8/1961  Kooiker et al.
3,014,575 A   12/1961  Klein
(Continued)

FOREIGN PATENT DOCUMENTS

BR    112016008674 A2   9/2017
CA    2927760 A1        4/2015
(Continued)

OTHER PUBLICATIONS

Brock, 16:1 Reduction Wheel Upgrade Kit S055938 for Bin Sweeps, All pages, Oct. 2016, Milford Indiana.
(Continued)

*Primary Examiner* — James Keenan
(74) *Attorney, Agent, or Firm* — Christopher A. Proskey; BrownWinick Law Firm

(57) ABSTRACT

A sweep auger system having a driveshaft with auger fighting and a backboard extending a length from an inward end to an outward end. An input of a gearbox is connected to an outward end of the drive shaft and a sweep wheel having a plurality of notches, arms and feet is connected to an output of the gearbox. A drive shield is placed around a rearward side of the sweep wheel that forms a channel that is configured to capture grain agitated by the drive wheel. A guide plate is connected to the gearbox and covers a portion of the gearbox. The guide plate angles from an upper outward edge downward and forward to a lower inward edge that is configured to urge the grain captured within the channel of the drive shield to move in front of the sweep auger system reducing grain left in the grain bin.

16 Claims, 30 Drawing Sheets

Related U.S. Application Data continuation of application No. 16/866,618, filed on May 5, 2020, now Pat. No. 11,414,281, which is a continuation of application No. 15/885,208, filed on Jan. 31, 2018, now Pat. No. 10,654,668.

(60) Provisional application No. 62/453,252, filed on Feb. 1, 2017.

(58) Field of Classification Search
USPC .................................................. 414/310, 312
See application file for complete search history.

(56) References Cited

U.S. PATENT DOCUMENTS

| | | |
|---|---|---|
| 3,057,608 A | 9/1962 | Patz et al. |
| 3,064,831 A | 11/1962 | Cook |
| 3,151,749 A | 10/1964 | Long |
| 3,175,676 A | 3/1965 | Vander Schaaf |
| 3,356,235 A | 12/1967 | Ladig |
| 3,394,825 A | 7/1968 | Reed |
| 3,532,232 A | 10/1970 | Sukup |
| 3,538,618 A | 11/1970 | Neuenschwander |
| 3,648,660 A | 3/1972 | Esquival |
| 3,749,259 A | 7/1973 | Stock |
| 3,755,917 A | 9/1973 | Lambert, Jr. |
| 3,800,964 A | 4/1974 | Patterson |
| 3,851,774 A | 12/1974 | Laidig |
| 3,974,908 A | 8/1976 | Keichinger |
| 4,008,816 A | 2/1977 | Harrison |
| 4,029,219 A | 6/1977 | Rutten |
| 4,057,151 A | 11/1977 | Weaver |
| 4,063,654 A | 12/1977 | Shivvers |
| 4,103,788 A | 8/1978 | Sutton |
| 4,142,621 A | 3/1979 | Oliver |
| 4,183,706 A | 1/1980 | Jackson |
| 4,286,909 A | 9/1981 | Tingskog |
| 4,578,012 A | 3/1986 | Petit |
| 4,583,903 A | 4/1986 | Hutchison |
| 4,585,385 A | 4/1986 | Buschbom |
| 4,701,093 A | 10/1987 | Meyer |
| 5,099,983 A | 3/1992 | Valdez |
| 5,167,318 A | 12/1992 | Siemens |
| 5,988,358 A | 11/1999 | Jonkka |
| 6,431,810 B1 | 8/2002 | Weaver |
| 6,499,930 B1 | 12/2002 | Dixon |
| 8,210,342 B2 | 7/2012 | Lepp |
| 8,616,823 B1 | 12/2013 | Hoogestraat |
| 8,739,479 B1 | 6/2014 | Nelson et al. |
| 8,770,388 B1 | 7/2014 | Chaon |
| 8,850,758 B1 | 10/2014 | Nelson et al. |
| 8,959,846 B2 | 2/2015 | Polzin et al. |
| 8,967,936 B2 | 3/2015 | Sukup |
| 8,967,937 B2 | 3/2015 | Schuelke et al. |
| 9,055,717 B2 | 6/2015 | Stumpe et al. |
| 9,137,950 B1 | 9/2015 | Stumpe et al. |
| 9,156,608 B1 | 10/2015 | Skaife |
| 9,156,622 B1 | 10/2015 | Chaon |
| 9,199,807 B1 | 12/2015 | Schuelke |
| 9,288,946 B1 | 3/2016 | Schuld |
| 9,290,335 B1 | 3/2016 | Witt |
| 9,327,921 B1 | 5/2016 | Olson |
| 9,546,055 B2 | 1/2017 | Hoogestraat |
| 9,650,217 B1 | 5/2017 | Hoogestraat |
| 9,809,402 B2 | 11/2017 | Nelson et al. |
| 9,815,639 B2 | 11/2017 | Schuelke et al. |
| 9,864,344 B2 | 1/2018 | Nelson et al. |
| 9,975,711 B2 | 5/2018 | Nelson |
| 10,011,442 B2 | 7/2018 | Witt |
| 10,214,361 B2 | 2/2019 | Kaeh |
| 10,220,420 B2 | 3/2019 | Witt |
| 10,220,968 B2 | 3/2019 | Stumpe et al. |
| 10,227,188 B1 | 3/2019 | Chaon |
| 10,377,573 B2 | 8/2019 | Olson |
| 10,442,641 B2 | 10/2019 | Nelson et al. |
| 10,654,668 B2 | 5/2020 | Olson |
| 10,676,294 B2 | 6/2020 | Harrenstein |
| 10,703,588 B1 | 7/2020 | Schram et al. |
| 10,836,582 B2 | 11/2020 | Olson |
| 11,104,528 B1 | 8/2021 | Bloemendaal et al. |
| 11,111,080 B2 | 9/2021 | Rauser |
| 11,136,205 B2 | 10/2021 | Gutwein |
| 11,267,664 B1 | 3/2022 | Bloemendaal et al. |
| 11,299,358 B1 | 4/2022 | Grass et al. |
| 11,337,374 B2 | 5/2022 | Olson |
| 11,414,281 B2 | 8/2022 | Olson |
| 11,454,444 B1 | 9/2022 | Bloemendaal |
| 11,608,236 B2 | 3/2023 | Olson |
| 11,618,639 B1 | 4/2023 | Grass et al. |
| 11,623,829 B2 | 4/2023 | Bloemendaal |
| 11,708,227 B2 | 7/2023 | Olson |
| 2004/0213650 A1 | 10/2004 | Epp |
| 2004/0228711 A1 | 11/2004 | Hanig |
| 2005/0263372 A1 | 1/2005 | Hollander et al. |
| 2006/0285942 A1 | 12/2006 | Fridgen |
| 2012/0163947 A1 | 6/2012 | Koch |
| 2013/0064629 A1 | 3/2013 | Schuelke |
| 2015/0210485 A1 | 7/2015 | Hoogestraat |
| 2016/0107849 A1 | 4/2016 | Olson |
| 2016/0152422 A1 | 6/2016 | Nelson |
| 2017/0158443 A1 | 6/2017 | Harrenstein |
| 2017/0275100 A1 | 9/2017 | Olson |
| 2018/0215559 A1 | 8/2018 | Olson |
| 2018/0237236 A1 | 8/2018 | Klubertanz |
| 2019/0322457 A1 | 10/2019 | Olson |
| 2020/0290826 A1 | 9/2020 | Gutwein |
| 2020/0361726 A1 | 11/2020 | Olson |
| 2021/0051856 A1 | 2/2021 | Olson |
| 2022/0250861 A1 | 8/2022 | Olson |
| 2023/0172112 A1 | 6/2023 | Olson |

FOREIGN PATENT DOCUMENTS

| | | |
|---|---|---|
| CA | 2963634 A1 | 4/2016 |
| CA | 2764847 C | 4/2019 |
| CA | 2775932 C | 6/2019 |
| CA | 2944342 C | 5/2022 |
| JP | 63074821 A | 4/1988 |
| WO | 2015/057835 A1 | 4/2015 |
| WO | 2015/120359 A1 | 8/2015 |
| WO | 2016/057264 A1 | 4/2016 |
| WO | 2016/141083 A1 | 9/2016 |

OTHER PUBLICATIONS

Haven Industries, Grain Saver Augers, Brochure, All pages, Jan. 1, 2015, Dexter Minnesota.
Westeel, Easyflow 2 U-Through Unload, Brochure, All pages, Jan. 1, 2015, Winnepeg Manitoba, Canada.
Sioux Steel Company, Newest Sweep Model, Brouchure, All pages, Jan. 1, 2015, Sioux Falls South Dakota.
Hutchinson, New Sweep End Wheel, Brochure, All pages, Jan. 1, 2015, Clay Center Kansas.
Springland Mfg., Automated U-Through Unload Systems, Brochure, All pages, Jan. 1, 2015, Manitoba Canada.
Norstar Industries, Grain Handling Systems, Brochure, All pages, Jan. 1, 2015, Morris Manitoba, Canada.
Brock, Bin sweeps, Brochure, All pages, Jan. 1, 2015, Milford Indiana.
GSI Group, Bin Unloading Systems, Brochure, All pages, Jan. 1, 2015, Assumption Illinois.
Sudenga Industries, Inc., Reduction Sweep Wheel, Brochure, All pages, Jan. 1, 2015, George Iowa.
NECO, Power Sweep Bin Unloading Systems, Brochure, All pages, Jan. 1, 2015, Omaha Nebraska.
Norwood Sales Inc., The Grain Handler, Website screenshots, All pages, Jan. 1, 2015, Horace North Dakota.
United Skid Tracks, Caterpillar 249B Track—Z-Lug, Oct. 4, 2021, Murfreesboro, TN, United States.
United Skid Tracks, Caterpillar Mini Excavators, Caterpillar Tracks, Oct. 4, 2021, Murfreesboro, TN, United States.

(56) References Cited

OTHER PUBLICATIONS

Patent Cooperation Treaty, International Search Report for PCT/US2022/045775, Mar. 14, 2023.
Brock Grain Systems, Commercial Bin Sweeps & Controllers, Sep. 30, 2021, Milford, IN, United States.
Norwood Sales Inc., The Grain Handler, Website screenshots, Oct. 2, 2017, Horace North Dakota.
Sukup, Unloading Equipment, Website screenshots, Apr. 1, 2019, Sheffield Iowa.
Sukup, Zero-Entry Commercial Paddle Sweep, Website Screenshots, Feb. 9, 2018, Sheffield Iowa.

SWEEP AUGER DRIVE SHIELD WITH GRAVITY RECLAIM

CROSS REFERENCE TO RELATED APPLICATIONS

This application is a continuation of United States Patent and Trademark Office Utility application Ser. No. 17/862,474, which was filed on Jul. 12, 2022, which is a continuation of United States Patent and Trademark Office Utility application Ser. No. 16/866,618 which was filed on May 5, 2020, which is a continuation of United States Patent and Trademark Office Utility application Ser. No. 15/885,208 which was filed on Jan. 31, 2018, which claims benefit of United States Patent and Trademark Office Provisional Application No. 62/453,252 which was filed on Feb. 1, 2017, the entirety of which is incorporated herein by reference.

FIELD OF THE ART

This disclosure relates to the material handling arts and grain handling arts. More specifically, and without limitation, this disclosure relates to a sweep auger for use in a grain bin.

BACKGROUND

Grain bins are massive structures used to store bulk flowable grain products such as corn, soybeans, wheat, rice, or any other grain products or granular or particulate material. Conventional grain bins are generally formed in a cylindrical shape with a corrugated sidewall covered by a peaked roof. Grain bins vary in height (ranging from twenty feet high to well over one hundred and fifty feet high), and vary in diameter (ranging from eighteen feet in diameter to well over one hundred and fifty feet in diameter). The storage capacity of modern grain bins can range anywhere from a few thousand bushels to well over a million bushels.

Grain bins are periodically filled with grain for storage purposes. As needed, grain is removed from the grain bin by opening sumps in an elevated floor of the grain bin that connect to an unload auger positioned below the floor. However, due to the flow properties of grain, or what is known as the angle of repose, the sumps and the unload auger cannot remove all of the gain from the grain bin.

The angle of repose is the steepest angle of descent relative to the horizontal plane to which a granular material can be piled without slumping. Due to the angle of repose of grain when a sump is opened only so much of the grain will naturally flow out of the sump. This leaves a reverse cone of grain between the sump and the grain bin wall.

To remove this residual grain left behind after using the sump(s) and the unload auger, a sweep auger is often employed. Conventional sweep augers include an auger that extends outward from a central pivot point and includes a driven wheel or sweep wheel at its end. Conventional sweep augers are configured to drive around the grain bin as they rotate upon the pivot point while moving residual grain within the grain bin toward the sumps located near the center of the bin.

While conventional sweep augers are effective at removing much of the residual grain left within a grain bin, conventional sweep augers themselves leave a lot of grain within the grain bin. This is largely due to the drive wheel positioned at the outward end of the sweep auger. The drive wheel is configured to rotate and engage the grain and/or the elevated floor of the grain bin in order to drive the sweep auger forward. However, in doing so, the drive wheel tends to throw grain behind the sweep auger and/or against the grain bin wall and out of reach for the sweep auger. Any residual grain left behind by the sweep auger must be removed by hand, by sweeping and shoveling, which is a manual-labor task that is laborious, time consuming, tedious and therefore undesirable.

While various attempts have been made in the prior art to improve sweep augers, each solution suffers from its own disadvantages and fails to provide an adequate solution.

Therefore, for all the reasons stated above, and the reasons stated below, there is a need in the art for an improved sweep auger system for cleaning grain out of a grain bin.

Thus, it is a primary object of at least one embodiment to provide a sweep auger system for cleaning grain out of a grain bin that improves upon the state of the art.

Another object of at least one embodiment is to provide an improved sweep auger system for cleaning grain out of a grain bin that reduces the amount of grain left behind by a sweep auger.

Yet another object of at least one embodiment is to provide an improved sweep auger system for cleaning grain out of a grain bin that reduces the amount of manual labor required to clean a grain bin.

Another object of at least one embodiment is to provide an improved sweep auger system for cleaning grain out of a grain bin that works effectively.

Yet another object of at least one embodiment is to provide an improved sweep auger system for cleaning grain out of a grain bin that is efficient to use.

Another object of at least one embodiment is to provide an improved sweep auger system for cleaning grain out of a grain bin that is easy to assemble.

Yet another object of at least one embodiment is to provide an improved sweep auger system for cleaning grain out of a grain bin that is robust.

Another object of at least one embodiment is to provide an improved sweep auger system for cleaning grain out of a grain bin that has a long useful life.

Yet another object of at least one embodiment is to provide an improved sweep auger system for cleaning grain out of a grain bin that does not negatively affect the sweep auger's ability to drive around the grain bin.

Another object of at least one embodiment is to provide an improved sweep auger system for cleaning grain out of a grain bin that is durable.

Yet another object of at least one embodiment is to provide an improved sweep auger system for cleaning grain out of a grain bin that is relatively inexpensive.

Another object of at least one embodiment is to provide an improved sweep auger system for cleaning grain out of a grain bin that is high quality.

Yet another object of at least one embodiment is to provide an improved sweep auger system for cleaning grain out of a grain bin that can be used with practically any grain bin.

Another object of at least one embodiment is to provide an improved sweep auger system for cleaning grain out of a grain bin that reduces the number of passes a sweep auger must make in order to empty a grain bin.

Yet another object of at least one embodiment is to provide an improved sweep auger system for cleaning grain out of a grain bin that makes it easier to handle grain.

These and other objects, features, or advantages of at least one embodiment will become apparent from the specification, figures and claims.

SUMMARY

A sweep auger system having a driveshaft with auger fighting, a backboard and a conduit extending a length from an inward end and an outward end. An input of a gearbox is connected to an outward end of the drive shaft and a sweep wheel having a plurality of notches is connected to an output of the gearbox. A drive shield is placed around a rearward side of the sweep wheel that forms a channel that is configured to capture grain agitated by the drive wheel. A guide plate is connected to the gearbox and covers a portion of the gearbox. The guide plate angles from an outward edge downward to an inward edge and is configured to urge the grain captured within the channel of the drive shield to move in front of the sweep auger system so that it may be removed by the sweep auger.

DETAILED DESCRIPTION

Figure 1:
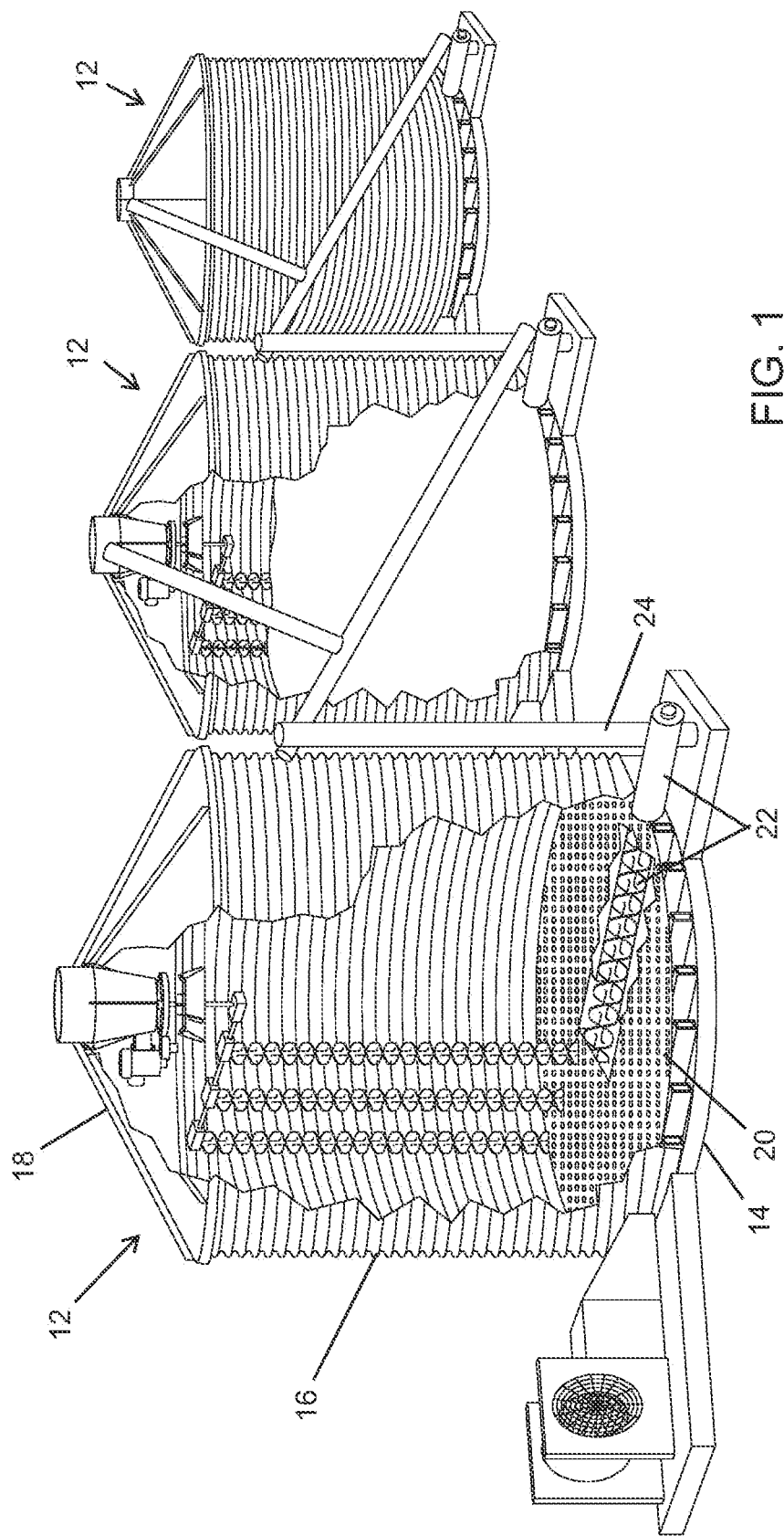
FIG. 1 is a perspective view of an exemplary grain handling site, the view showing a grain bin having a foundation, a corrugated sidewall, a peaked roof, an elevated floor, an unload auger positioned below the elevated floor and a transfer device in the form of a transfer auger connected to the unload auger.
Figure 2:
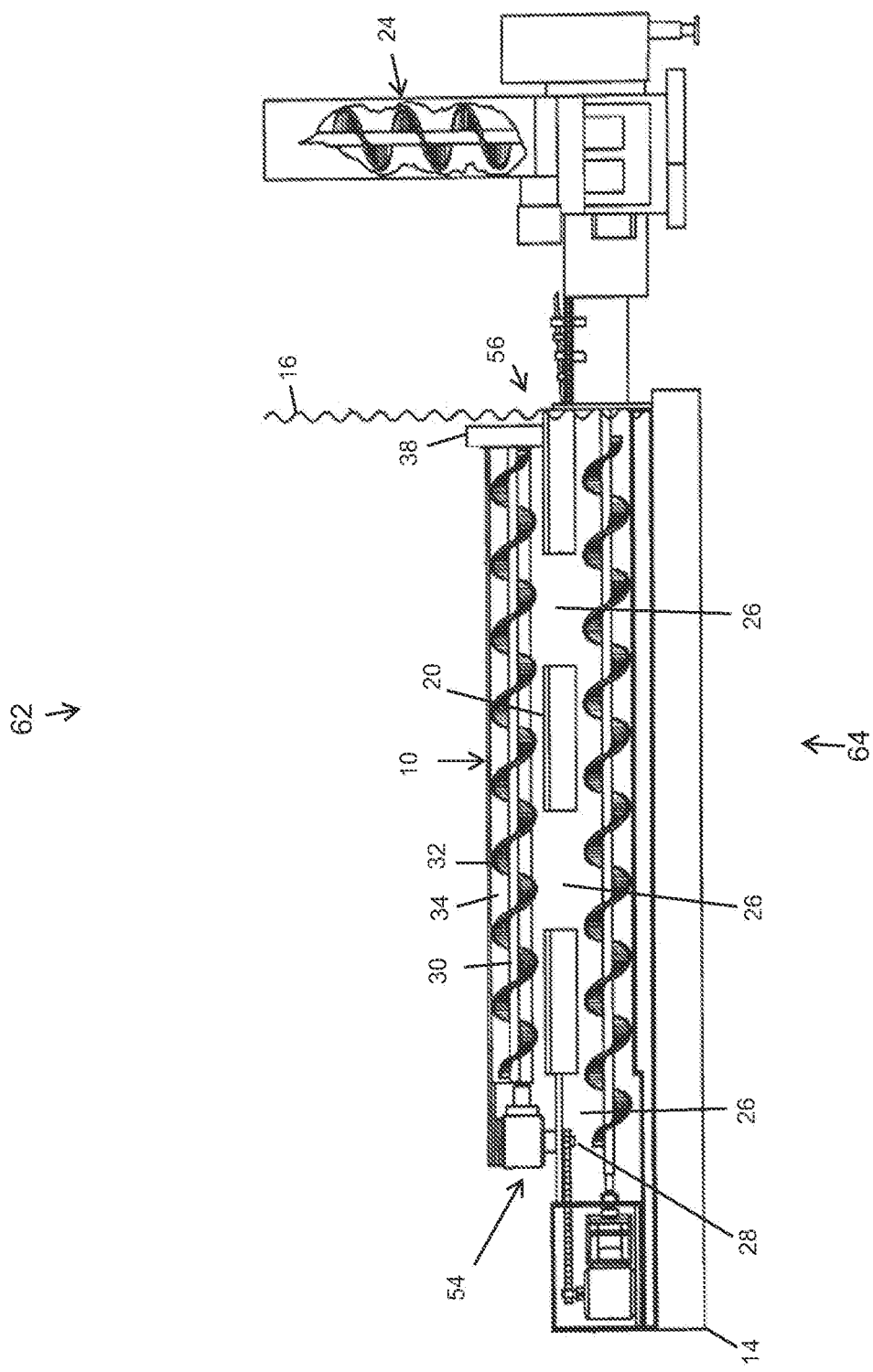
FIG. 2 is a side cut-away elevation view of an exemplary grain bin, the view showing a foundation, a corrugated sidewall, an elevated floor, an unload auger positioned below the elevated floor and a transfer device in the form of a transfer auger connected to the unload auger; the view also showing a sweep auger system positioned above the elevated floor and a plurality of sumps in the elevated floor.
Figure 3:
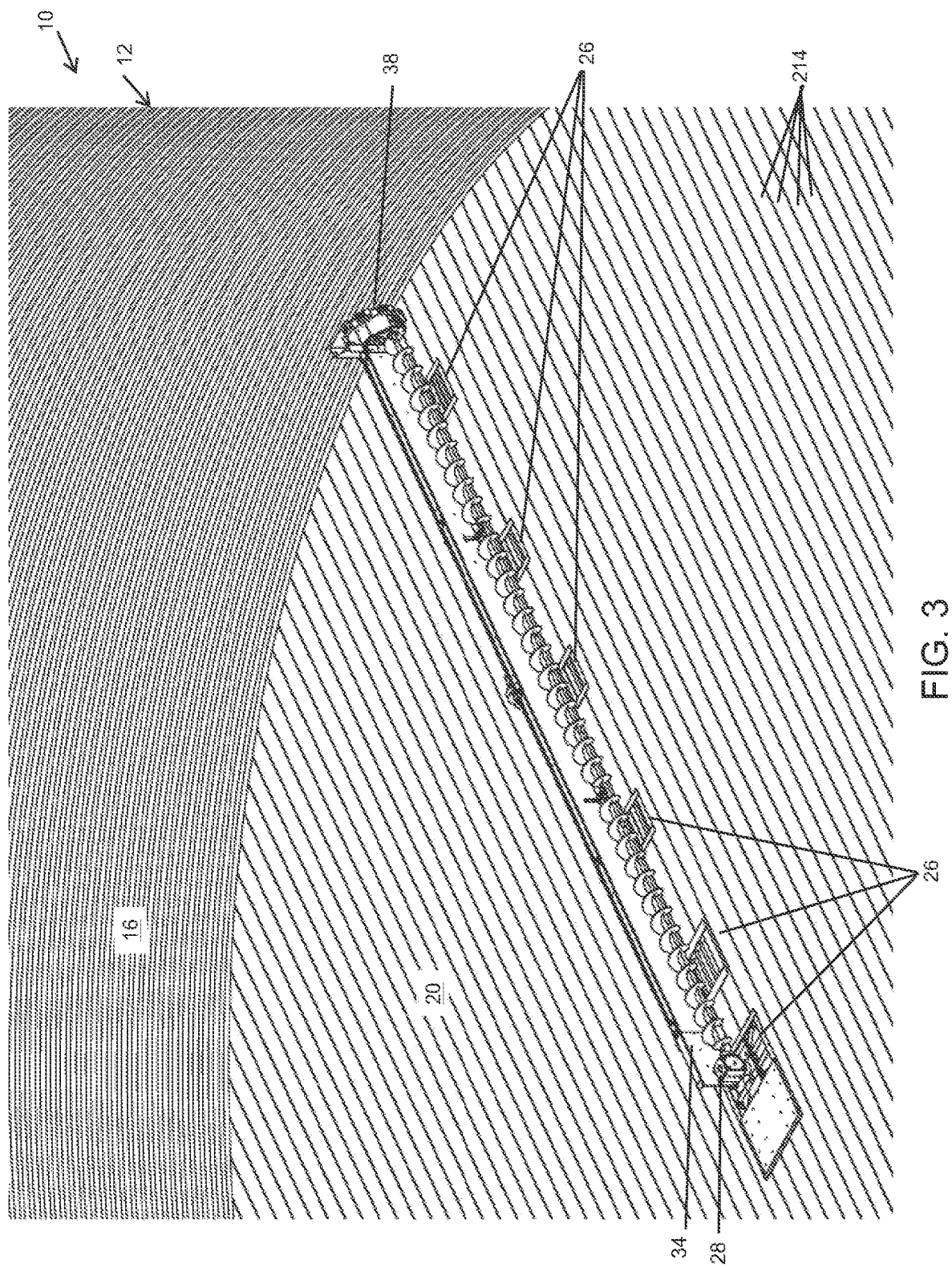
FIG. 3 is a perspective view of an exemplary sweep auger system positioned within an exemplary grain bin, the view showing a sweep auger system positioned on top of an elevated floor and just within the sidewall of the grain bin; the view showing the sweep auger connected at its inward end to a pivot point; the view showing a sweep wheel connected to the outward end of the auger system; the view showing the auger system having a backboard, and a driveshaft with auger fighting.
Figure 4:
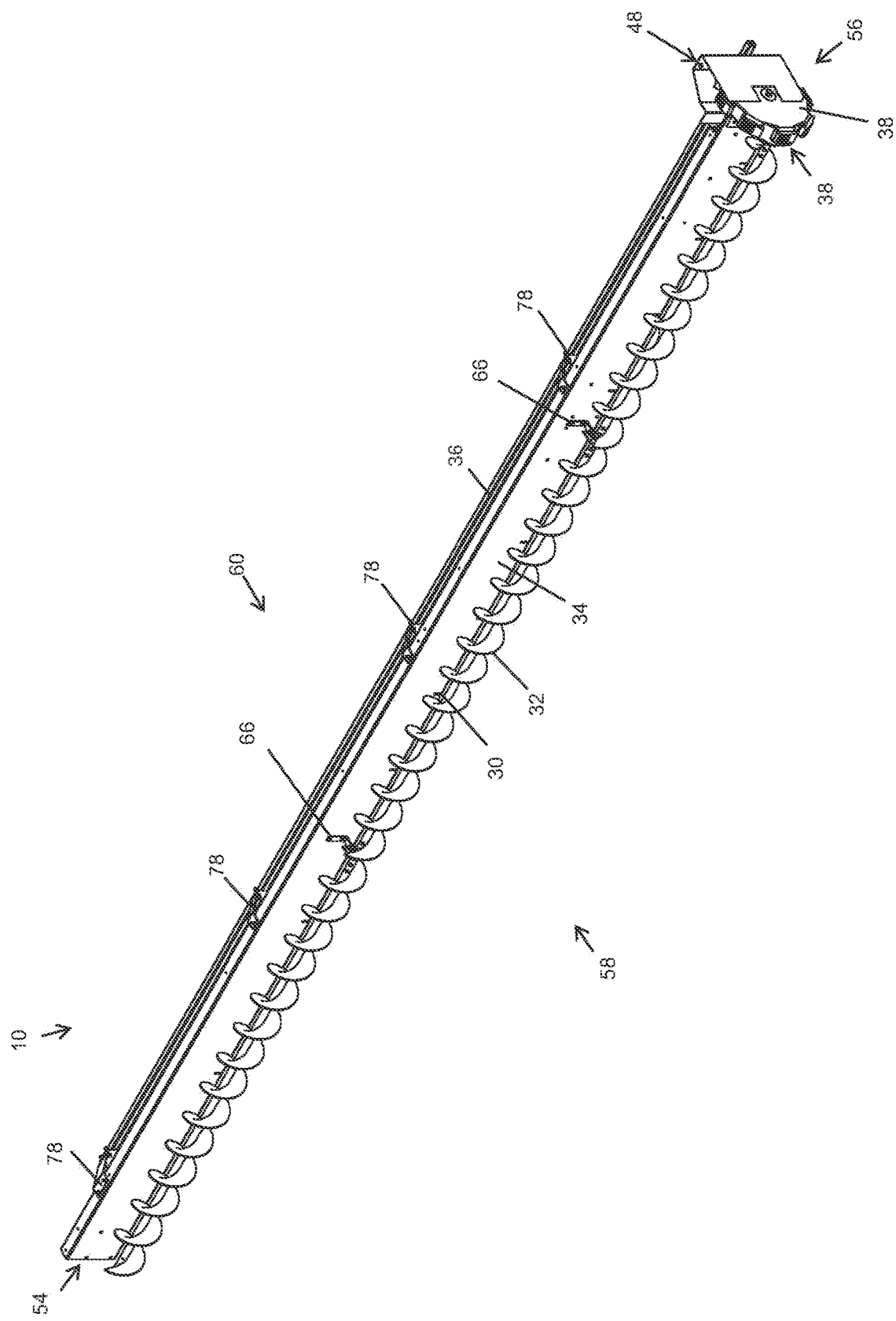
FIG. 4 is a perspective view of a sweep auger system having a drive shaft surrounded by auger fighting, a backboard and a conduit, a gear box connected to the outward end of the drive shaft and a sweep wheel connected to the gear box; the sweep wheel is positioned within a drive shield that forms a channel around the rearward side of the sweep wheel and is configured to capture grain that is moved rearward by the sweep wheel; a guide plate is connected to the gear box and is configured to direct the grain captured within the drive shield back in front of the sweep auger system so that it may be removed by the sweep auger.
Figure 5:
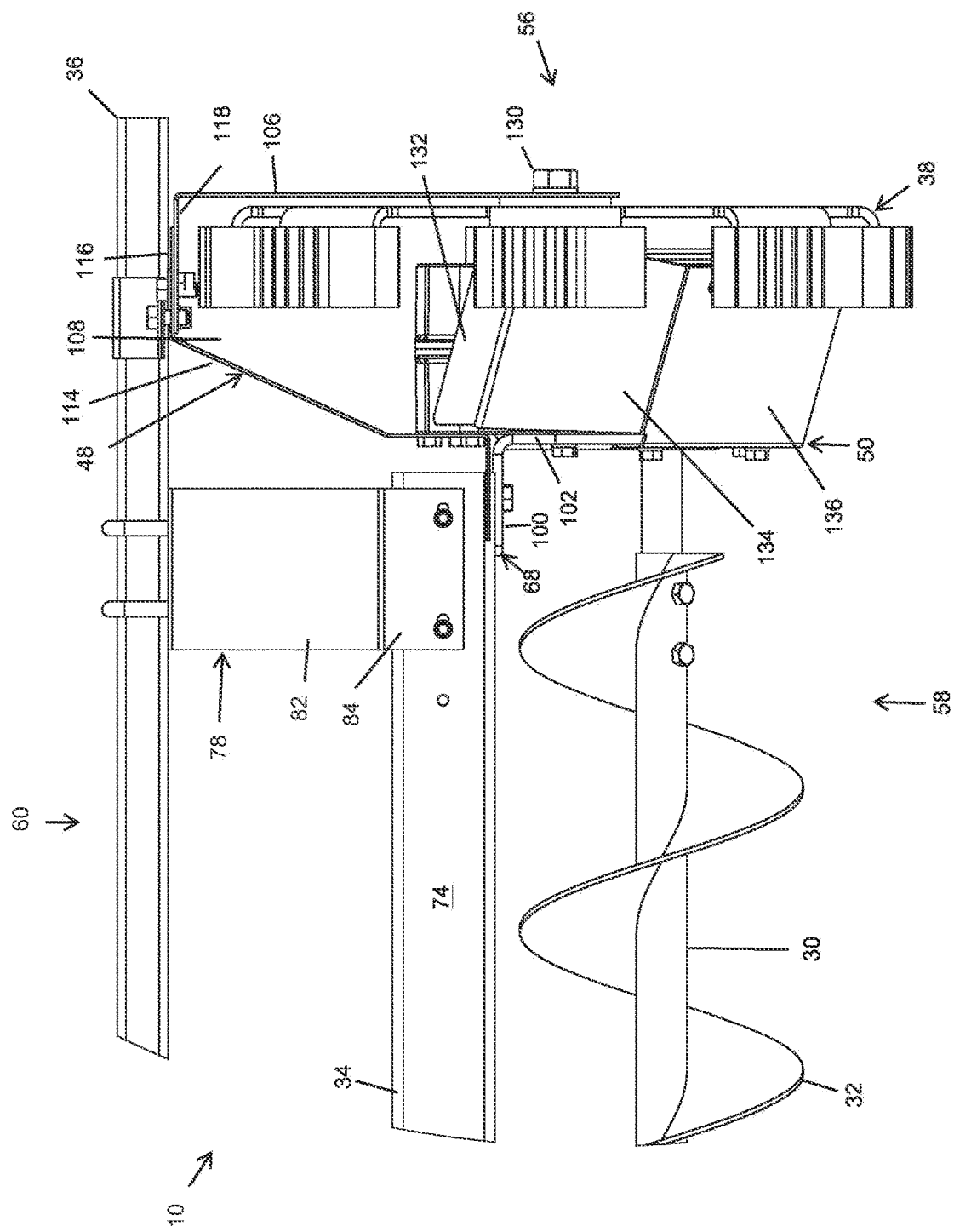
FIG. 5 is a top elevation view of the outward end of the sweep auger system presented in FIG. 4; the view showing the channel formed by the drive shield that contains the sweep wheel; the view showing the guide plate that directs the grain captured within the channel of the drive shield back in front of the sweep auger system.
Figure 6:
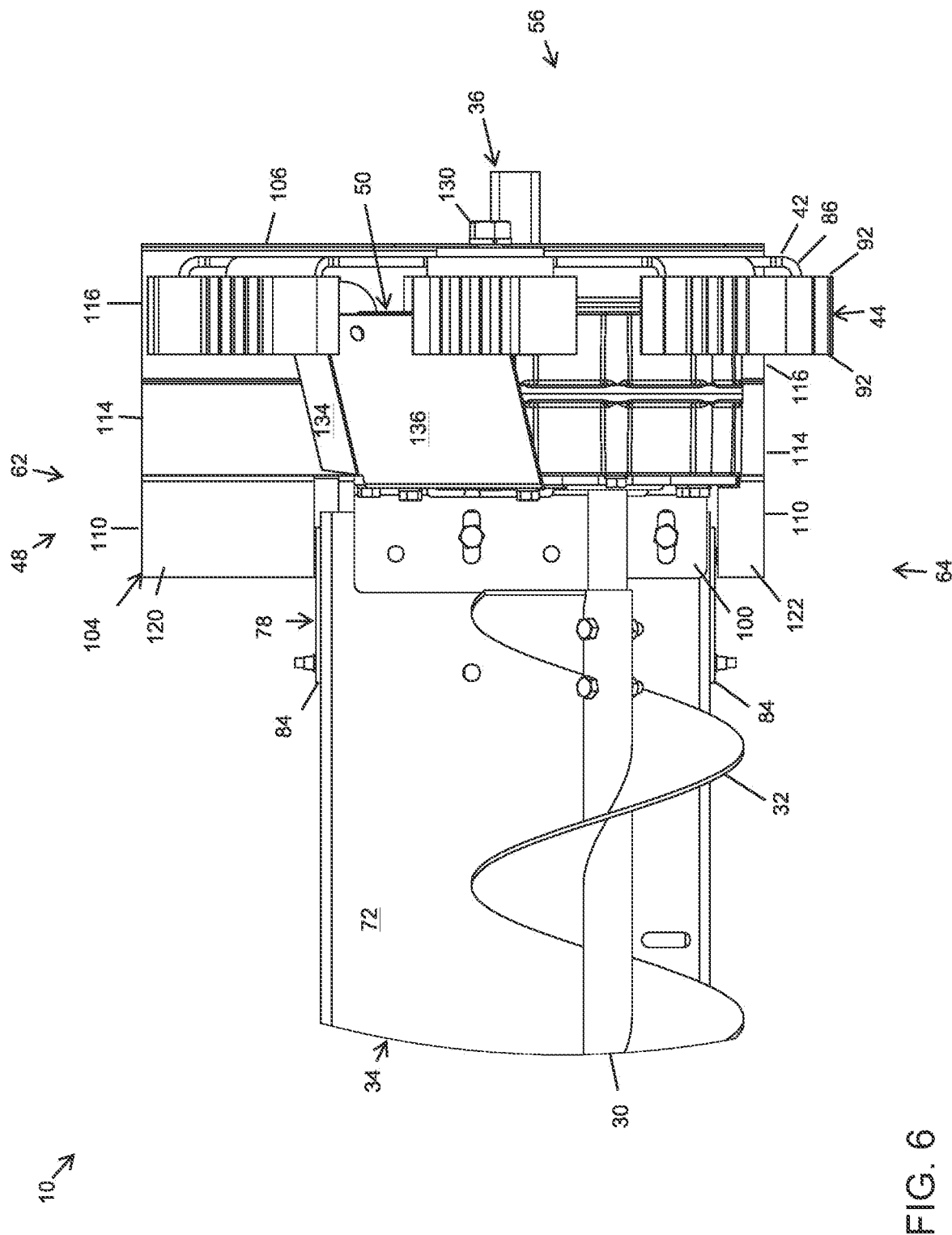
FIG. 6 is a front elevation view of the outward end of the sweep auger system presented in FIG. 4; the view showing the drive shield that contains the sweep wheel; the view showing the guide plate that directs the grain captured within the channel of the drive shield back in front of the sweep auger system.
Figure 7:
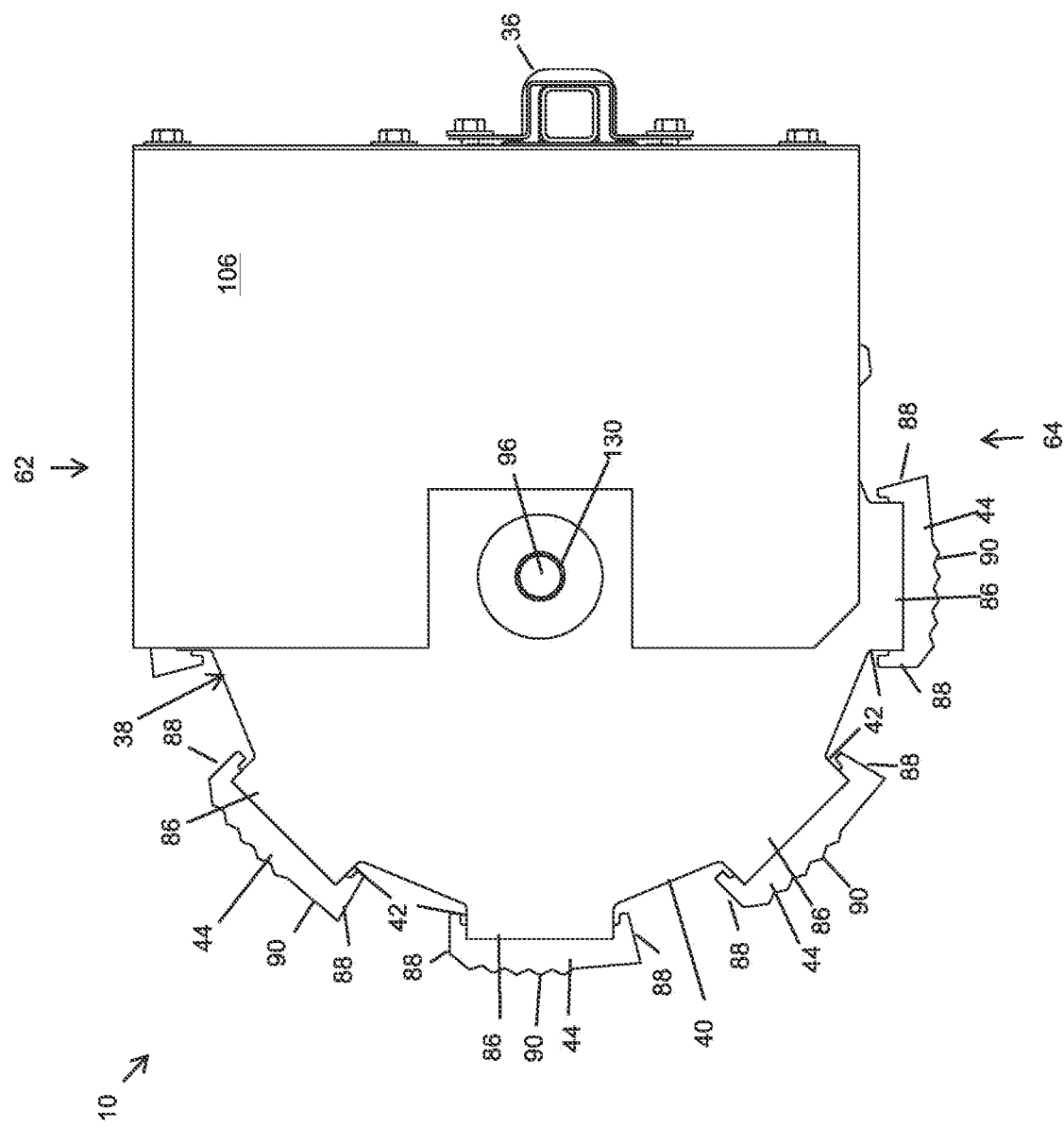
FIG. 7 is a side elevation view of the outward end of the sweep auger system presented in FIG. 4; the view showing the drive shield that contains the sweep wheel.
Figure 8:
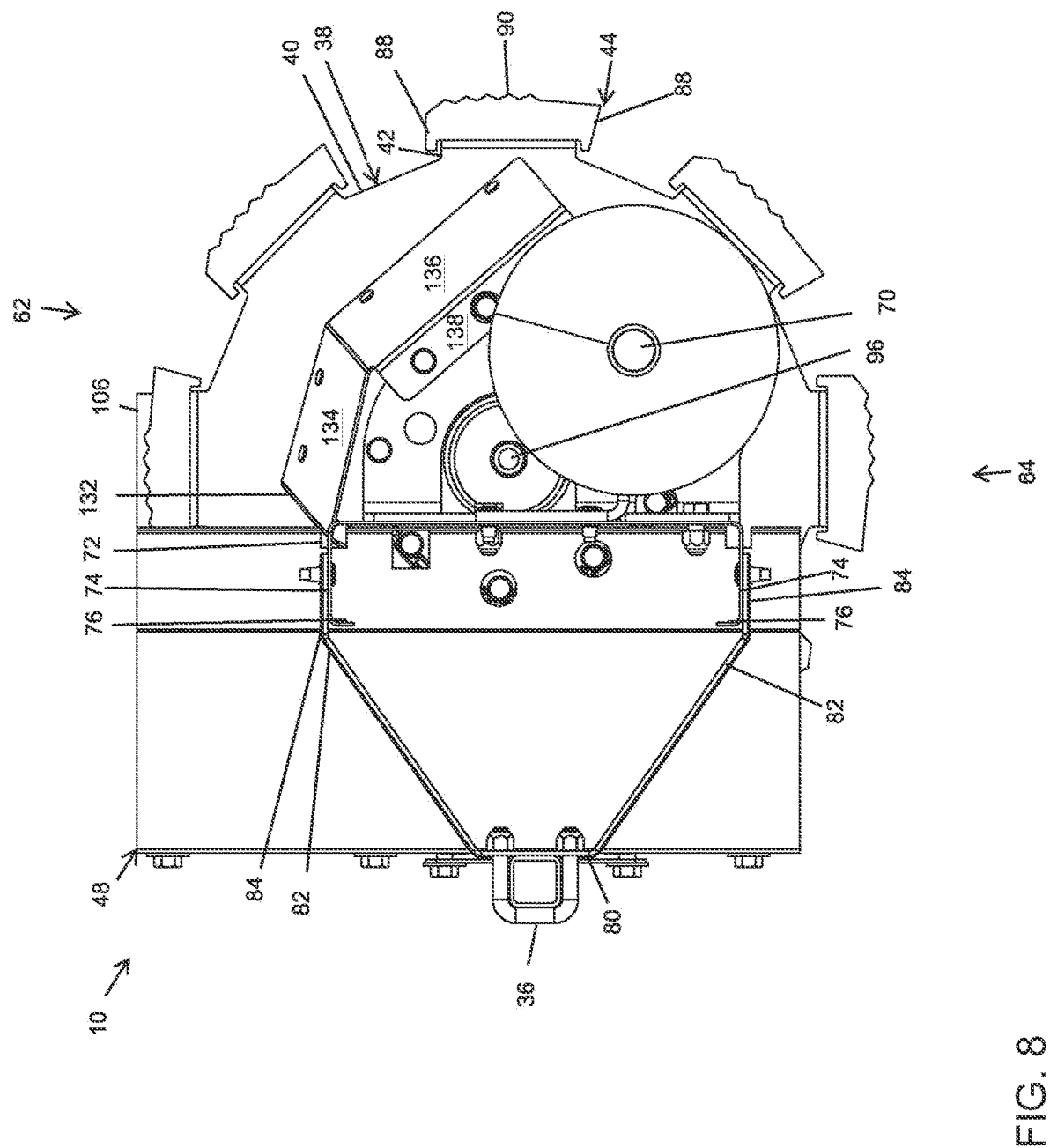
FIG. 8 is a side elevation view of the inward end of the sweep auger system presented in FIG. 4; the view showing the drive shield that contains the sweep wheel; the view showing the guide plate that directs the grain captured within the channel of the drive shield back in front of the sweep auger system.
Figure 9:
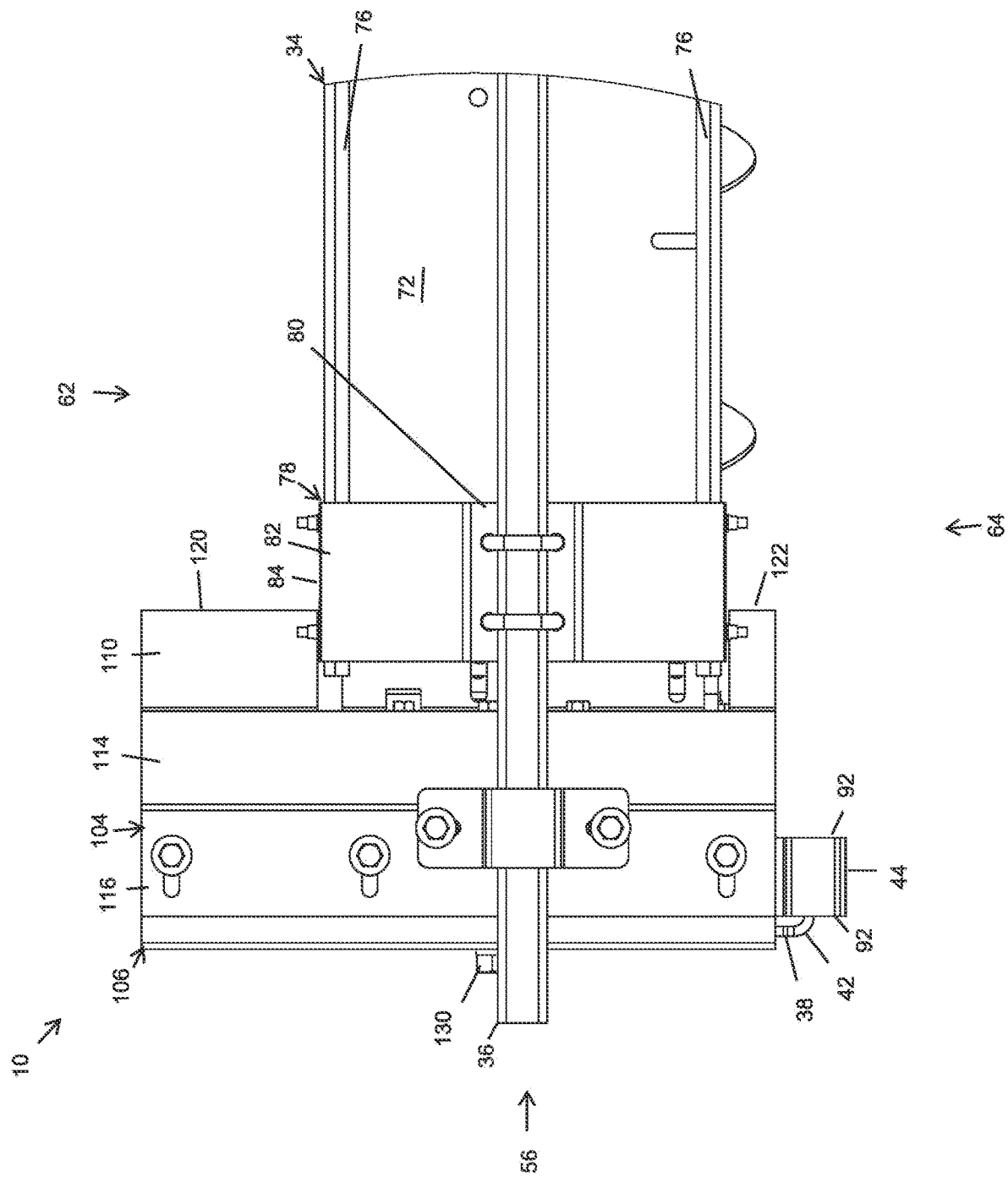
FIG. 9 is a rear elevation view of the outward end of the sweep auger system presented in FIG. 4; the view showing the drive shield that contains the sweep wheel.
Figure 10:
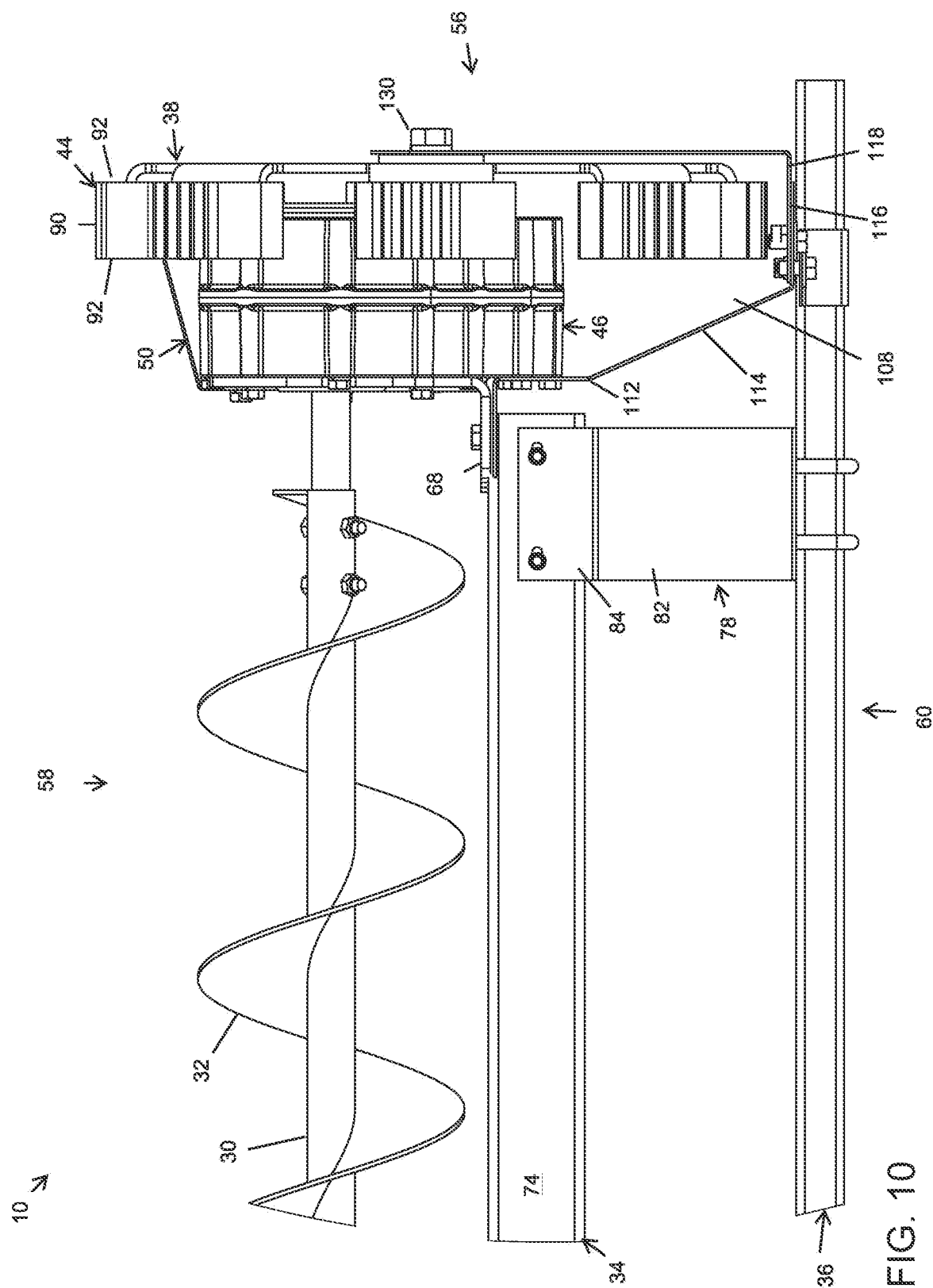
FIG. 10 is a bottom elevation view of the outward end of the sweep auger system presented in FIG. 4; the view showing the channel formed by the drive shield that contains the sweep wheel; the view showing the guide plate that directs the grain captured within the channel of the drive shield back in front of the sweep auger system.
Figure 11:
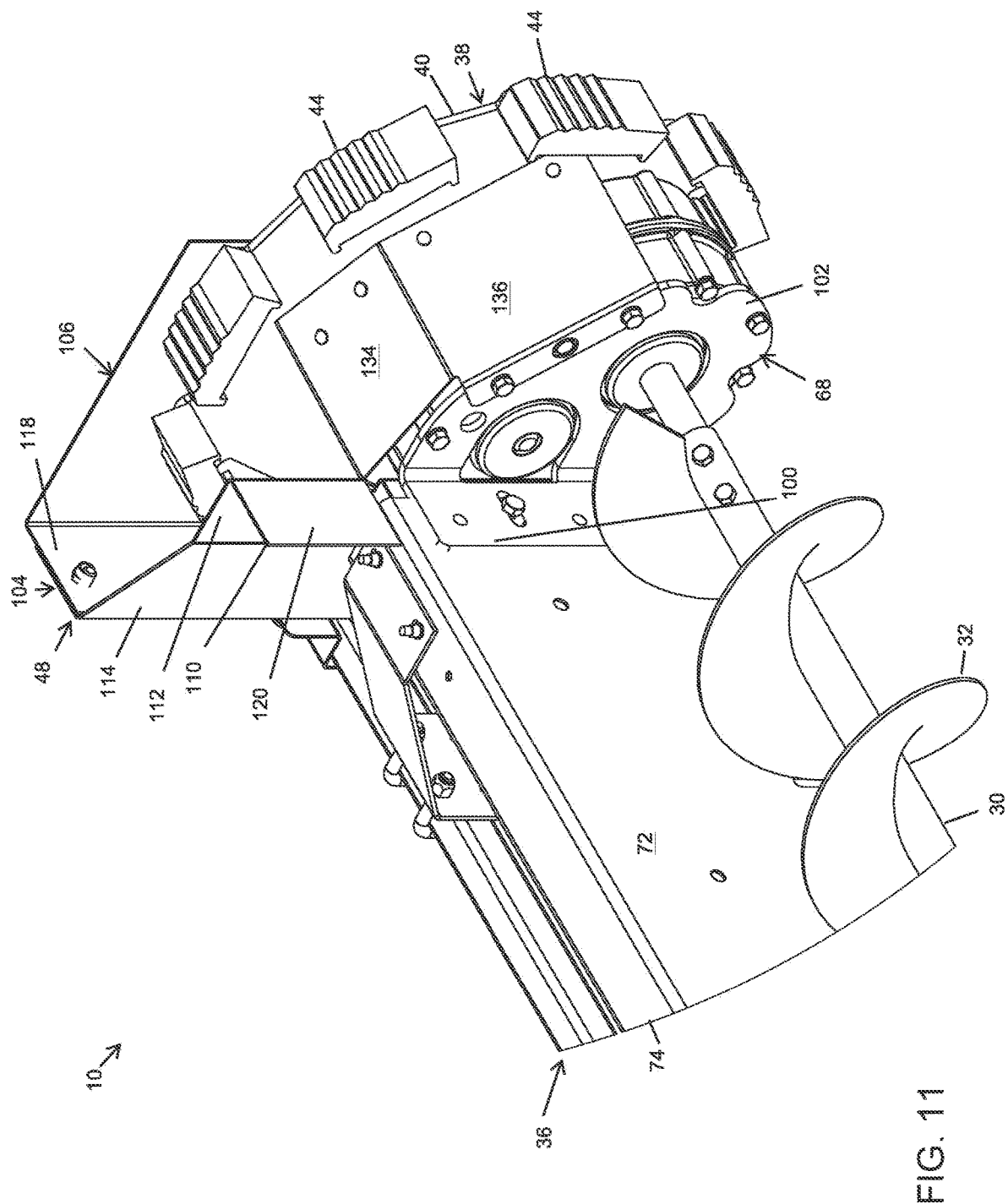
FIG. 11 is a perspective view outward end of the of the sweep auger system presented in FIG. 4; the view showing the channel formed by the drive shield that contains the sweep wheel; the view showing the guide plate that directs the grain captured within the channel of the drive shield back in front of the sweep auger system.
Figure 12:
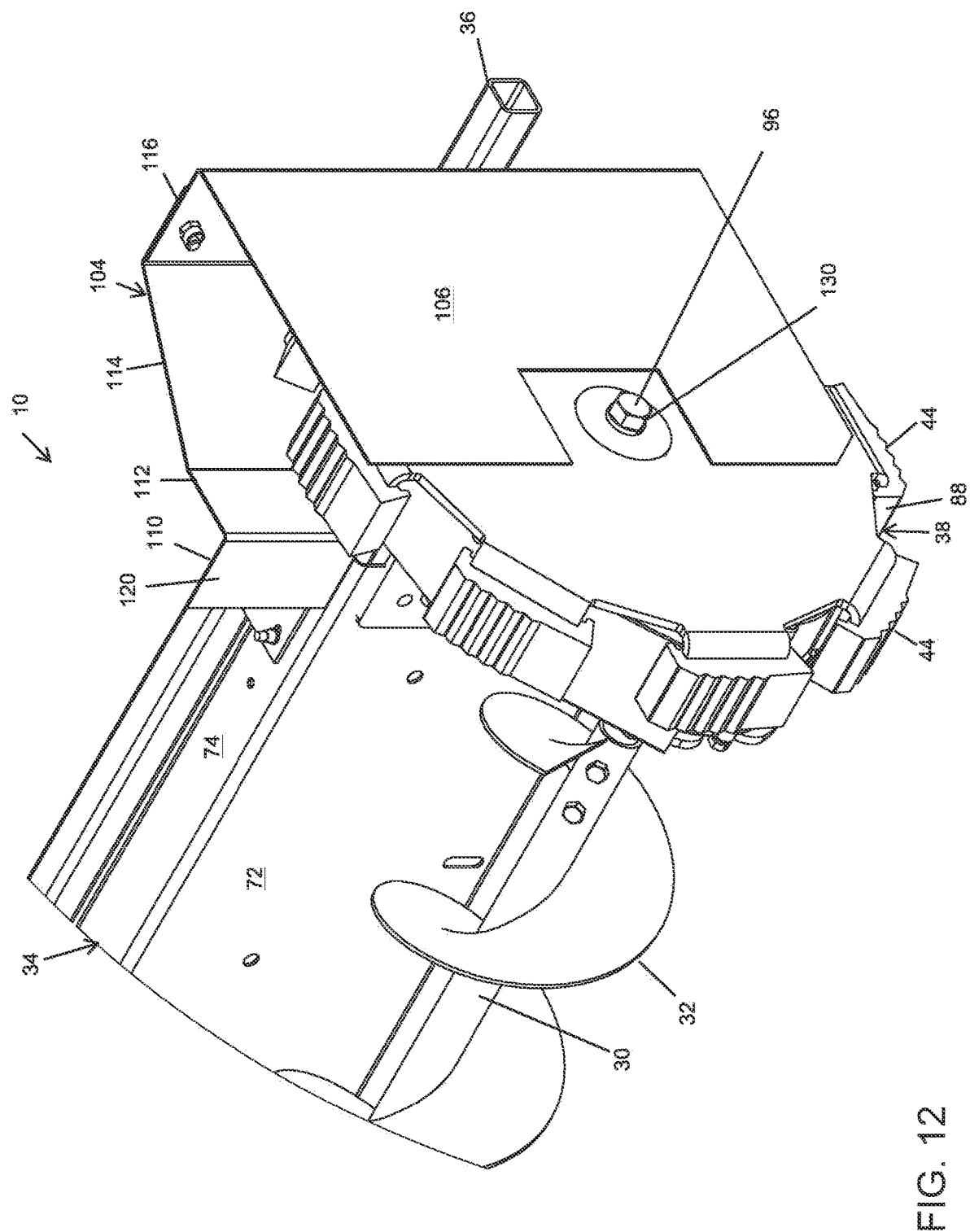
FIG. 12 is another perspective view of the outward end of the of the sweep auger system presented in FIG. 4.
Figure 13:
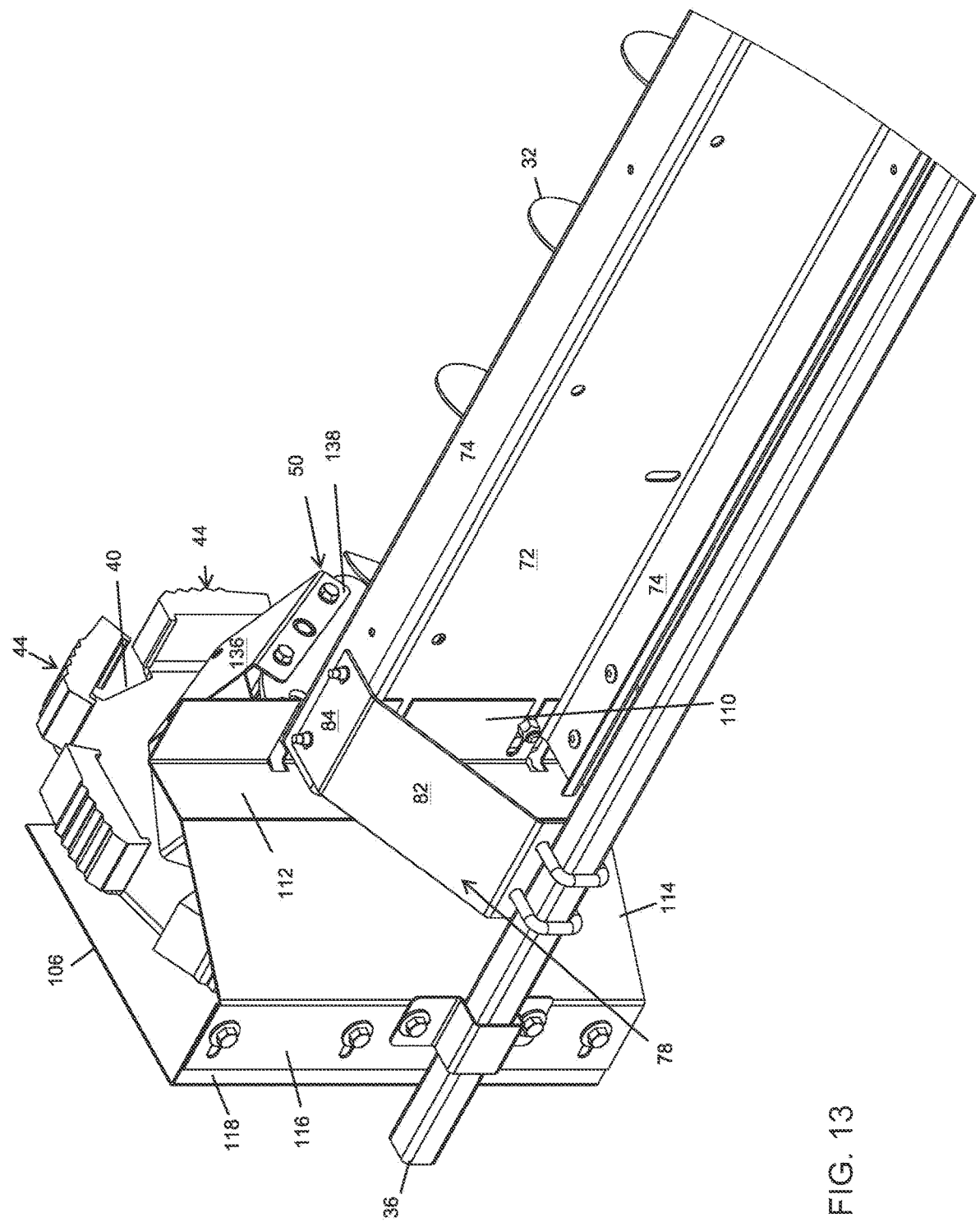
FIG. 13 is another perspective view of the outward end of the of the sweep auger system presented in FIG. 4.
Figure 14:
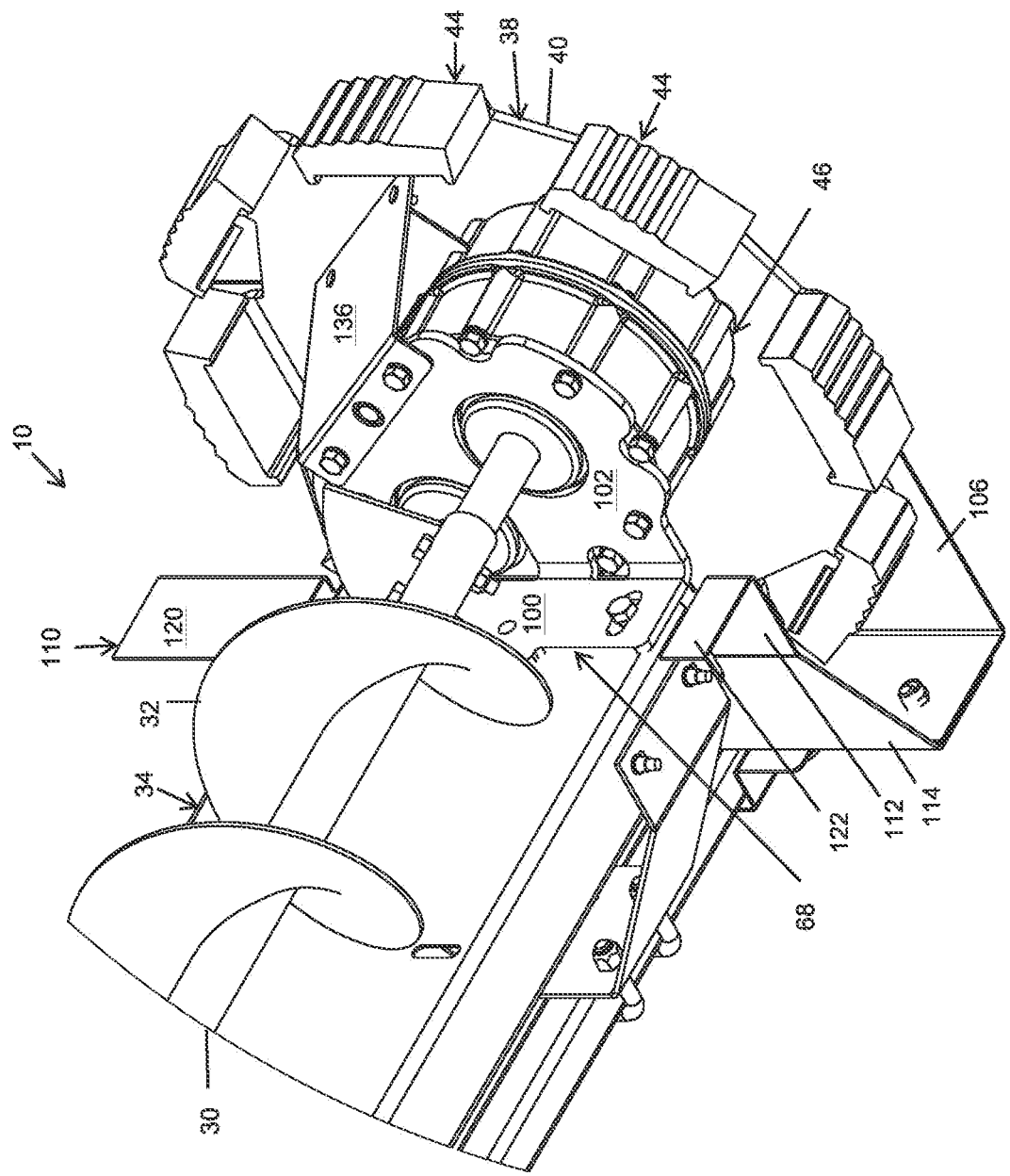
FIG. 14 is another perspective view of the outward end of the of the sweep auger system presented in FIG. 4.
Figure 15:
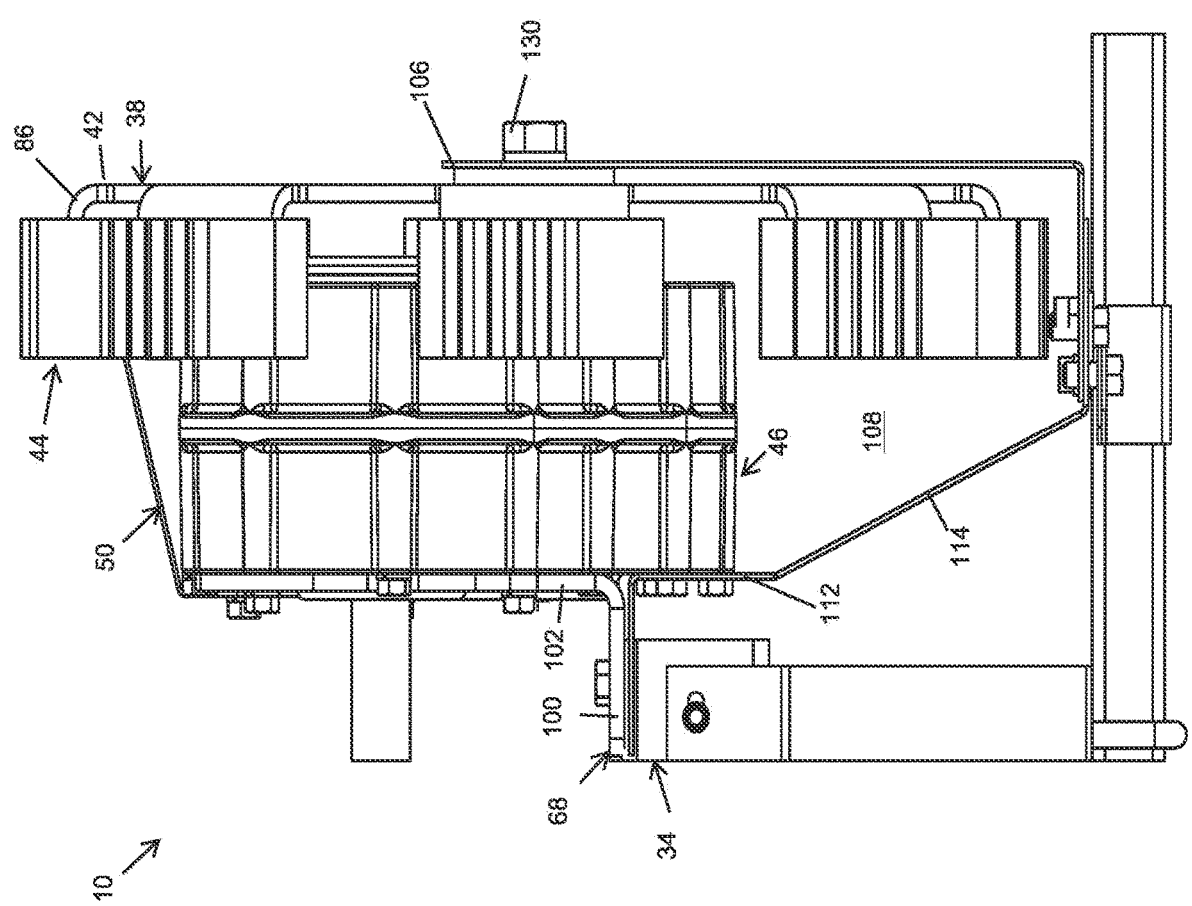
FIG. 15 is a close-up bottom elevation view of the outward end of the sweep auger system presented in FIG. 4; the view showing the channel formed by the drive shield that contains the sweep wheel; the view showing the guide plate that directs the grain captured within the channel of the drive shield back in front of the sweep auger system.
Figure 16:
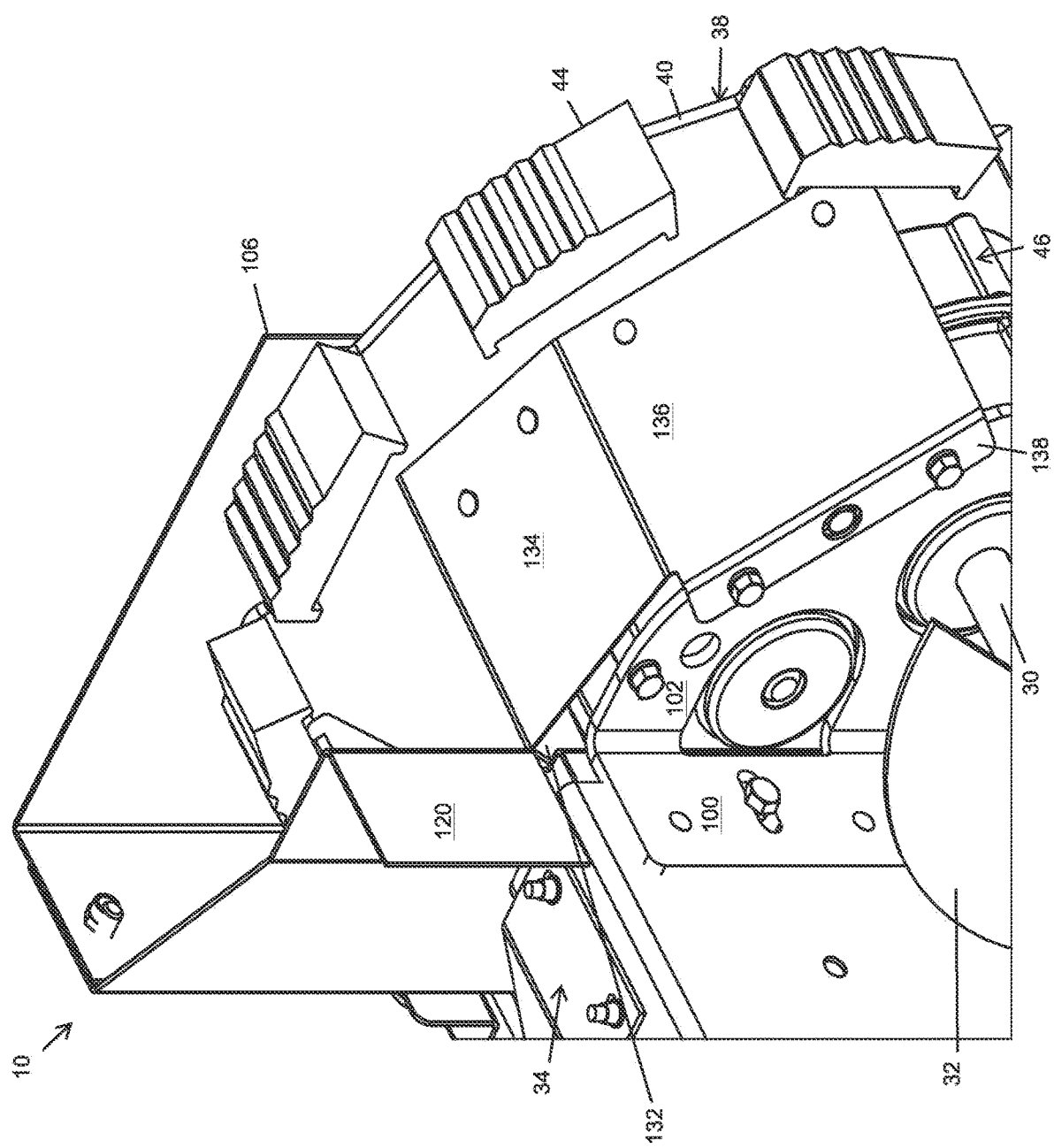
FIG. 16 is another perspective view of the outward end of the of the sweep auger system presented in FIG. 4.
Figure 17:
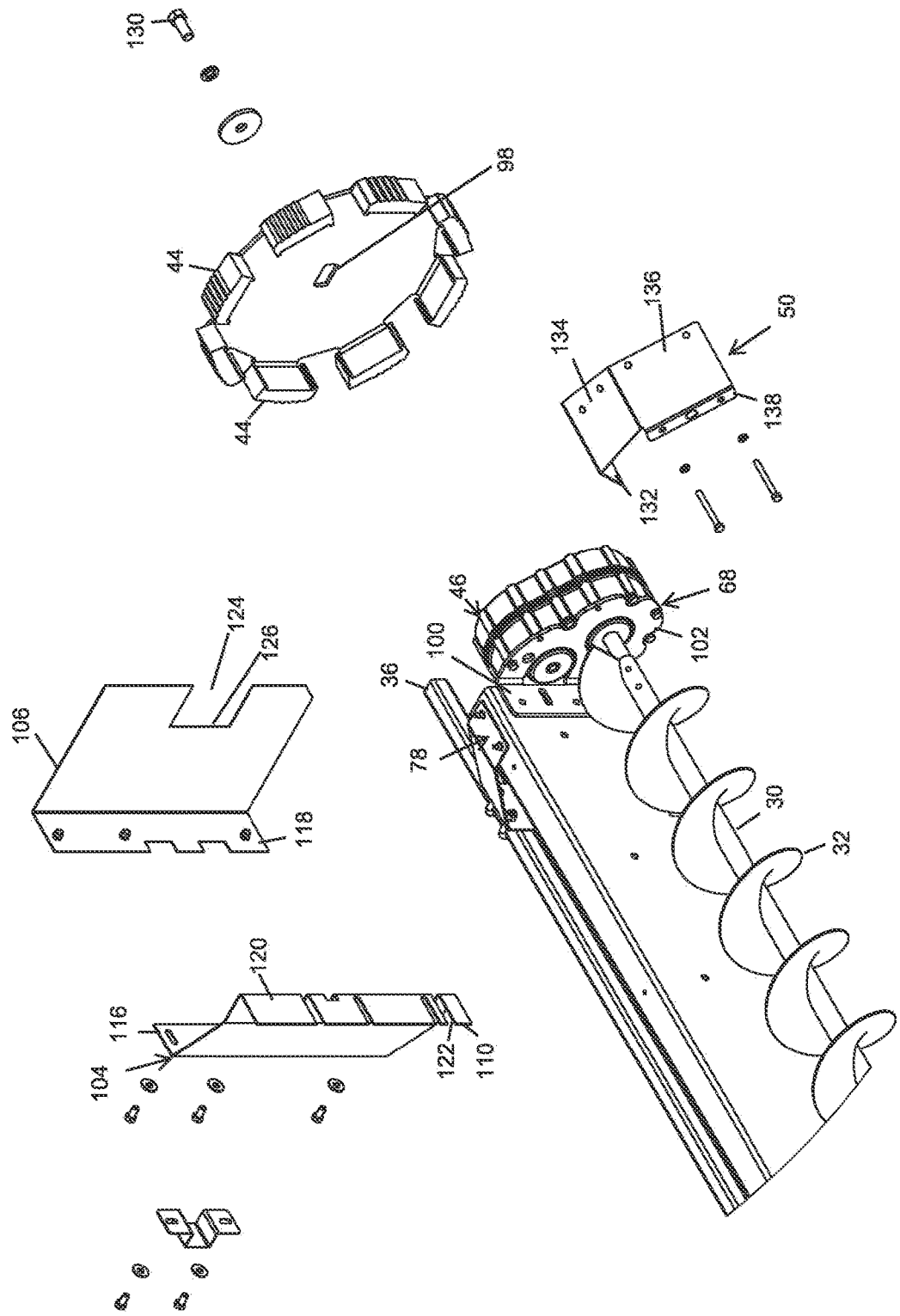
FIG. 17 is an exploded perspective view of the outward end of the sweep auger system presented in FIG. 4; the view showing the inner portion and the outer portion of the drive shield; the view showing the guide plate; the view showing the sweep wheel.
Figure 18:
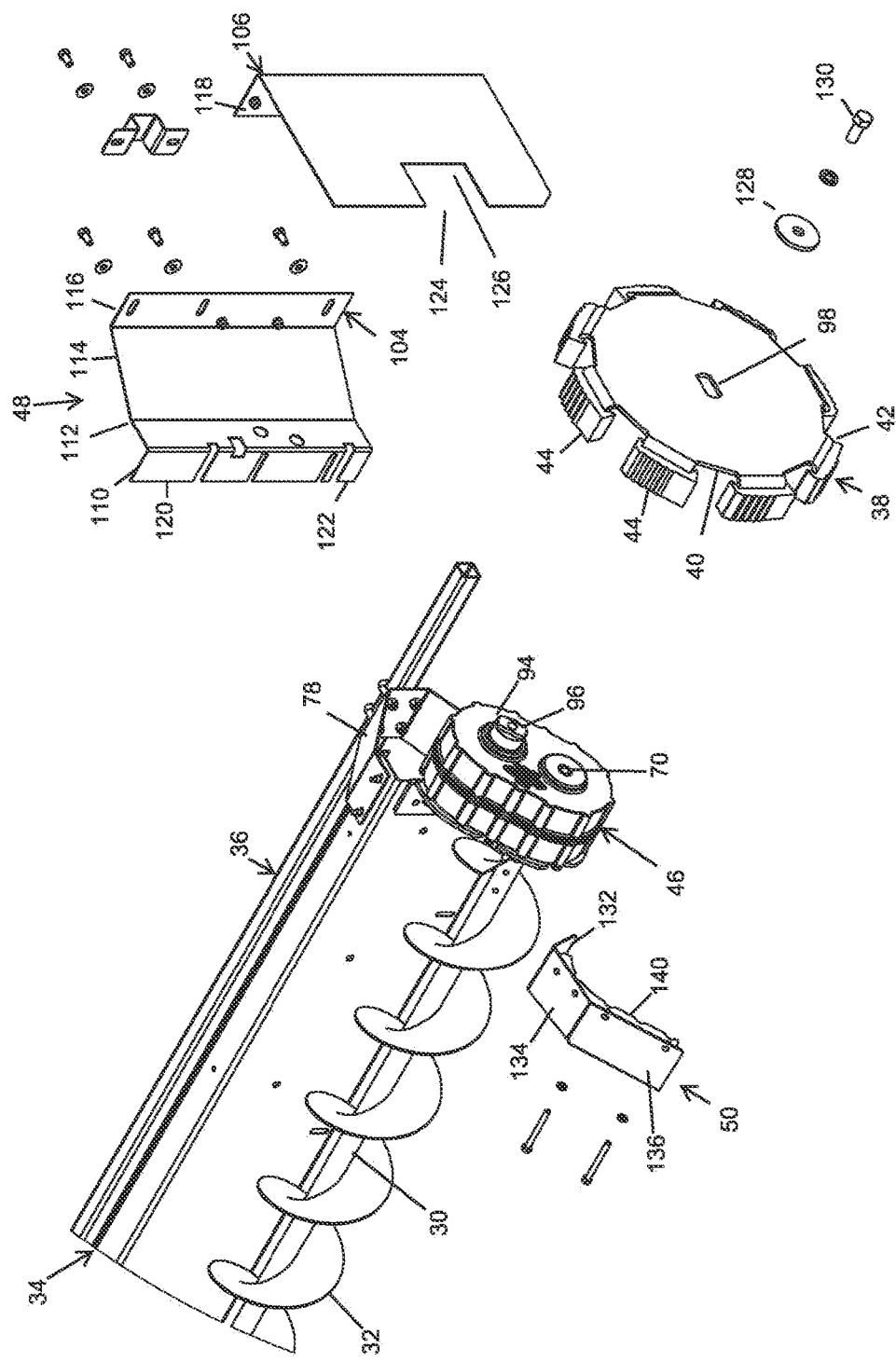
FIG. 18 is an exploded perspective view of the outward end of the sweep auger system presented in FIG. 4; the view showing the inner portion and the outer portion of the drive shield; the view showing the guide plate; the view showing the sweep wheel.
Figure 19:
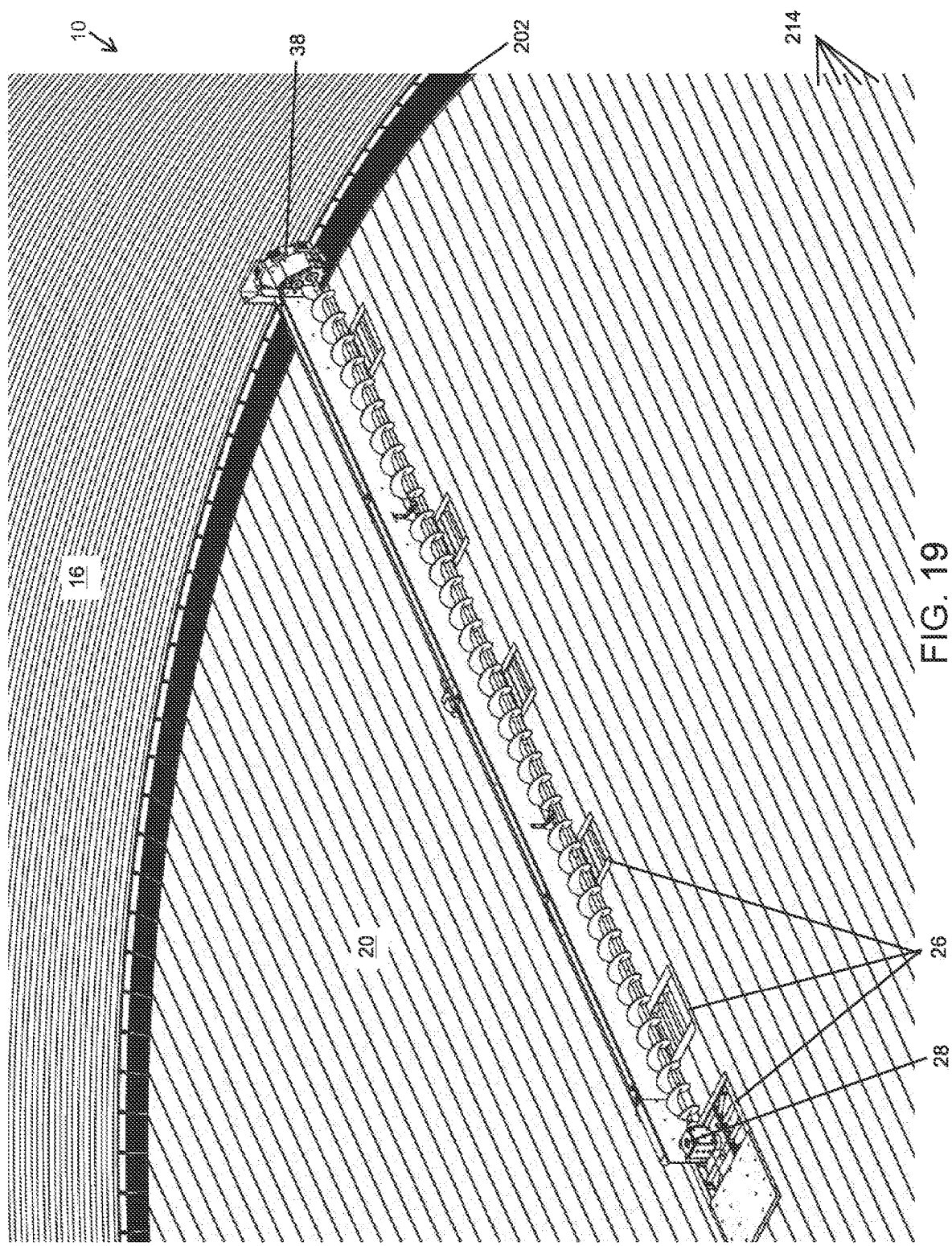
FIG. 19 is a perspective view inside of a grain bin, the view showing a sweep auger system having a sweep wheel, the view showing the feet of the sweep wheel having a plurality of teeth thereon, wherein these teeth are configured to mesh with corresponding features in a strip of flashing positioned around the exterior of the grain bin floor at the intersection of the grain bin floor and the sidewall of the grain bin.
Figure 20:
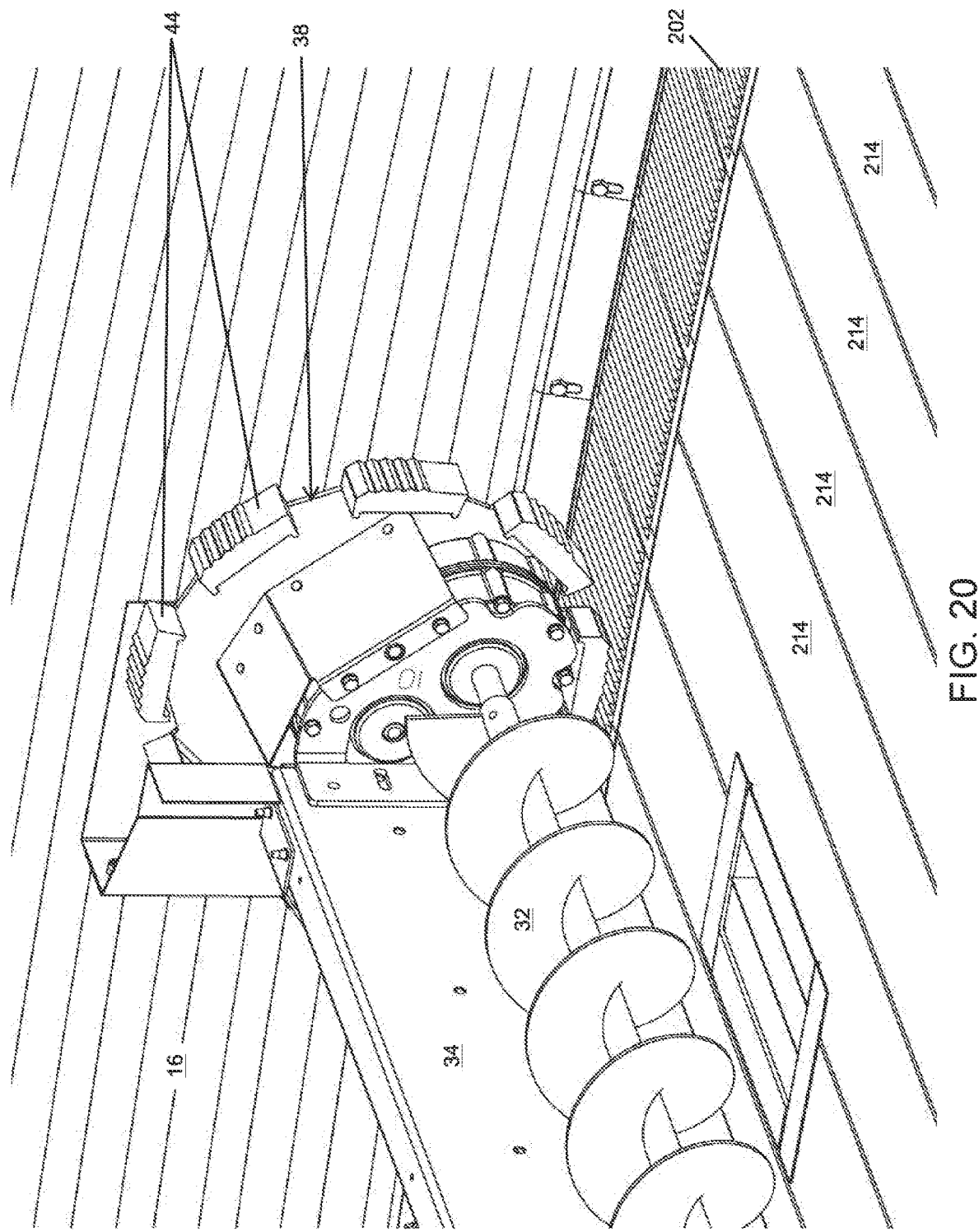
FIG. 20 is a close-up perspective view of FIG. 19, the view showing a sweep auger system having a sweep wheel, the view showing the feet of the sweep wheel having a plurality of teeth thereon, wherein these teeth are configured to mesh with corresponding features in a strip of flashing positioned around the exterior of the grain bin floor at the intersection of the grain bin floor and the sidewall of the grain bin.
Figure 21:
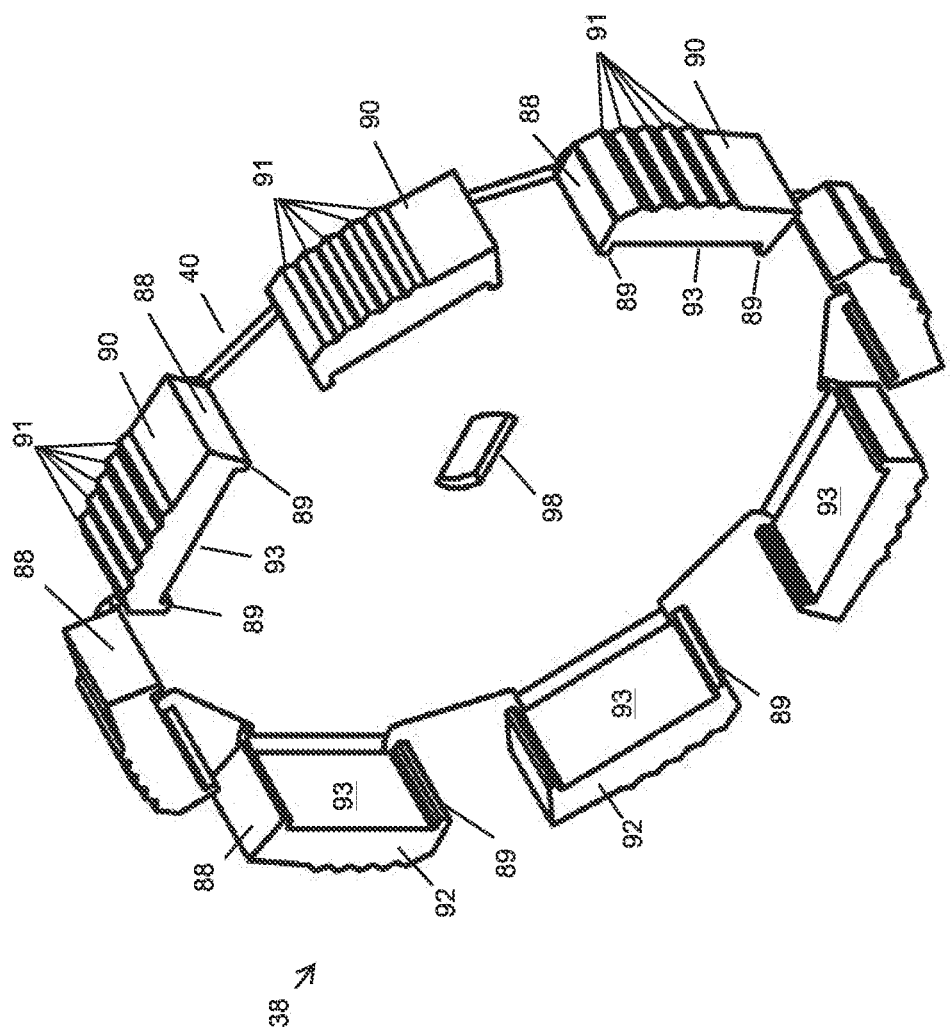
FIG. 21 is a close-up perspective view of the sweep wheel of FIGS. 19 and 20, the view showing the feet of the sweep wheel having a plurality of teeth thereon, wherein these teeth are configured to mesh with corresponding features in a strip of flashing positioned around the exterior of the grain bin floor at the intersection of the grain bin floor and the sidewall of the grain bin.
Figure 22:
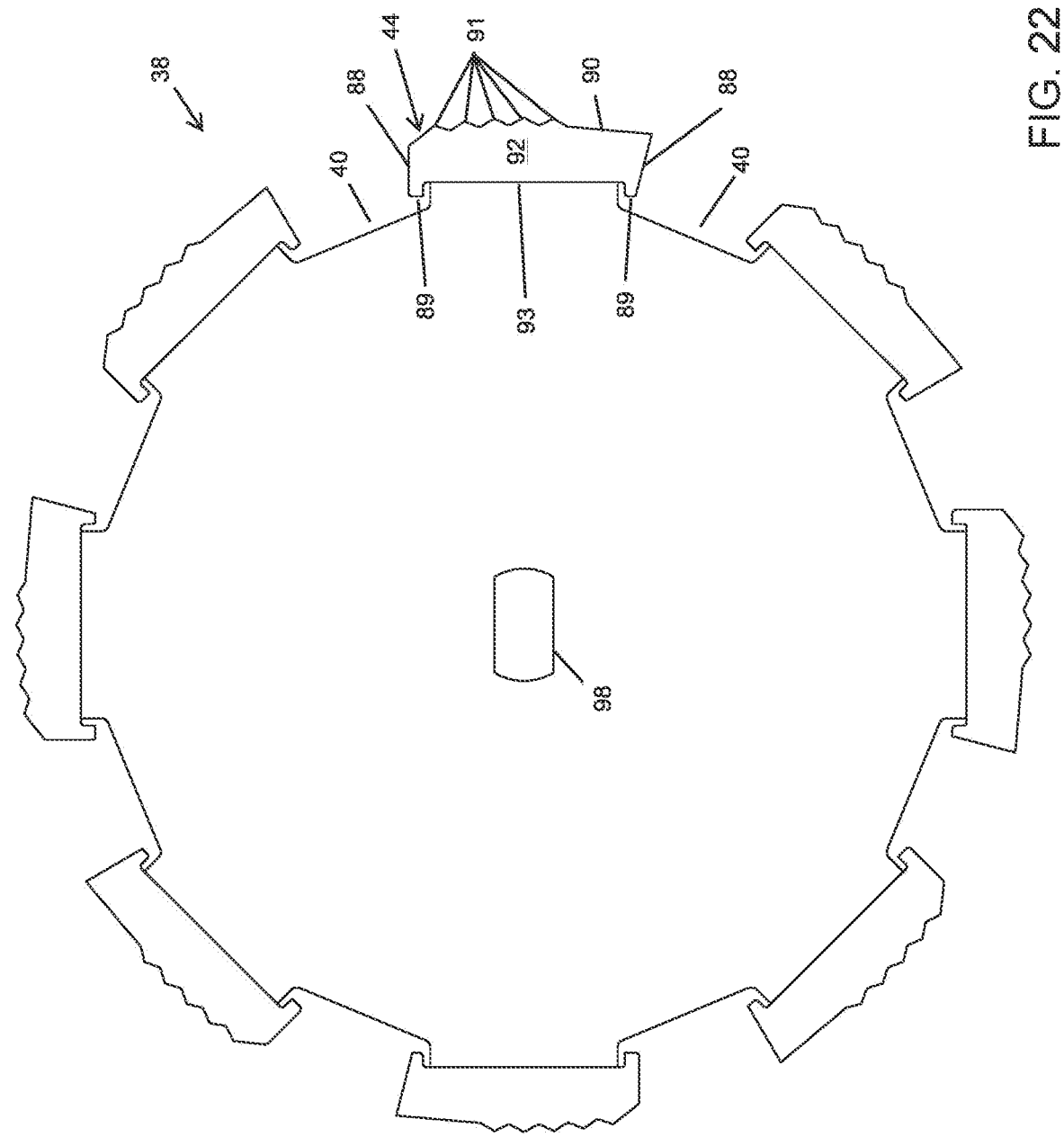
FIG. 22 is a close-up elevation view of the sweep wheel of FIGS. 19-21, the view showing the feet of the sweep wheel having a plurality of teeth thereon, wherein these teeth are configured to mesh with corresponding features in a strip of flashing positioned around the exterior of the grain bin floor at the intersection of the grain bin floor and the sidewall of the grain bin.
Figure 23:
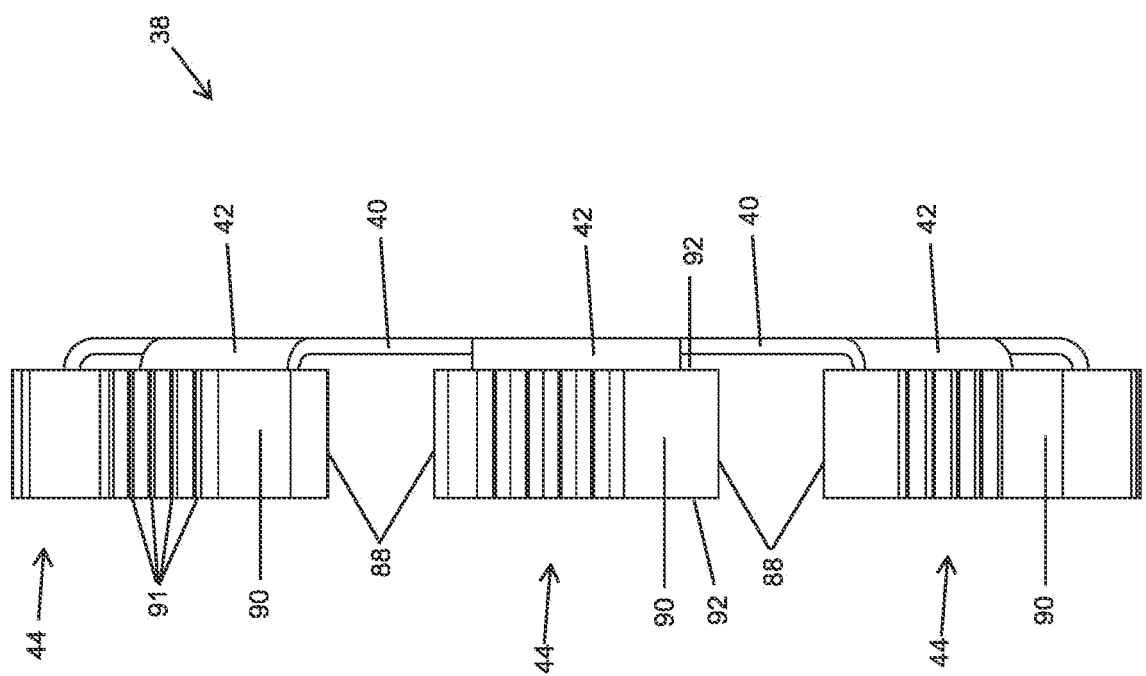
FIG. 23 is a close-up elevation view of the sweep wheel of FIGS. 19-22, the view showing the feet of the sweep wheel having a plurality of teeth thereon, wherein these teeth are configured to mesh with corresponding features in a strip of flashing positioned around the exterior of the grain bin floor at the intersection of the grain bin floor and the sidewall of the grain bin.
Figure 24:
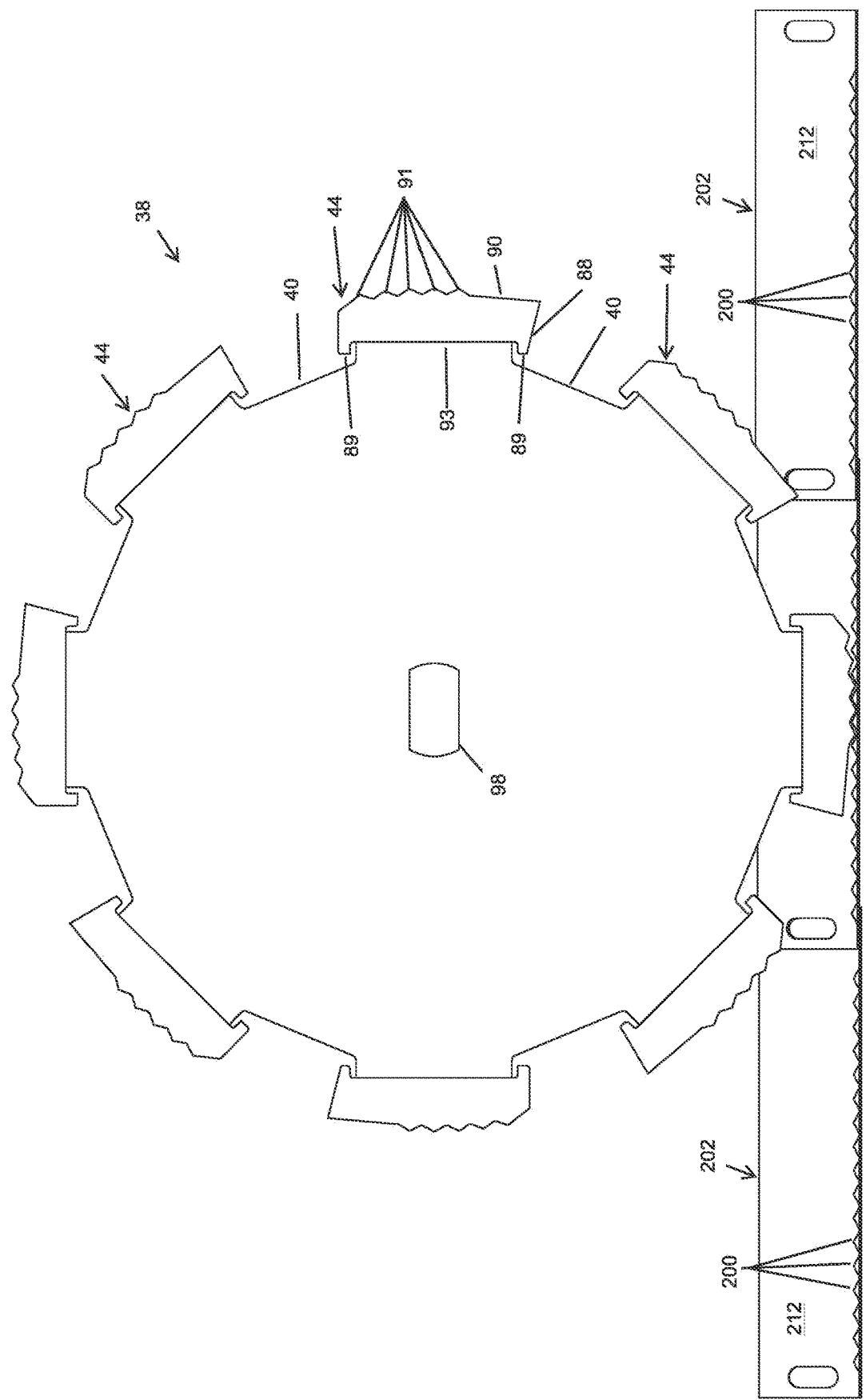
FIG. 24 is a close-up elevation view of the sweep wheel of FIGS. 19-23, the view showing the feet of the sweep wheel having a plurality of teeth thereon, wherein these teeth are configured to mesh with corresponding features in a strip of flashing positioned around the exterior of the grain bin floor at the intersection of the grain bin floor and the sidewall of the grain bin; the view showing the teeth of the feet of the sweep wheel meshed with the features of the flashing of the grain bin floor.
Figure 25:
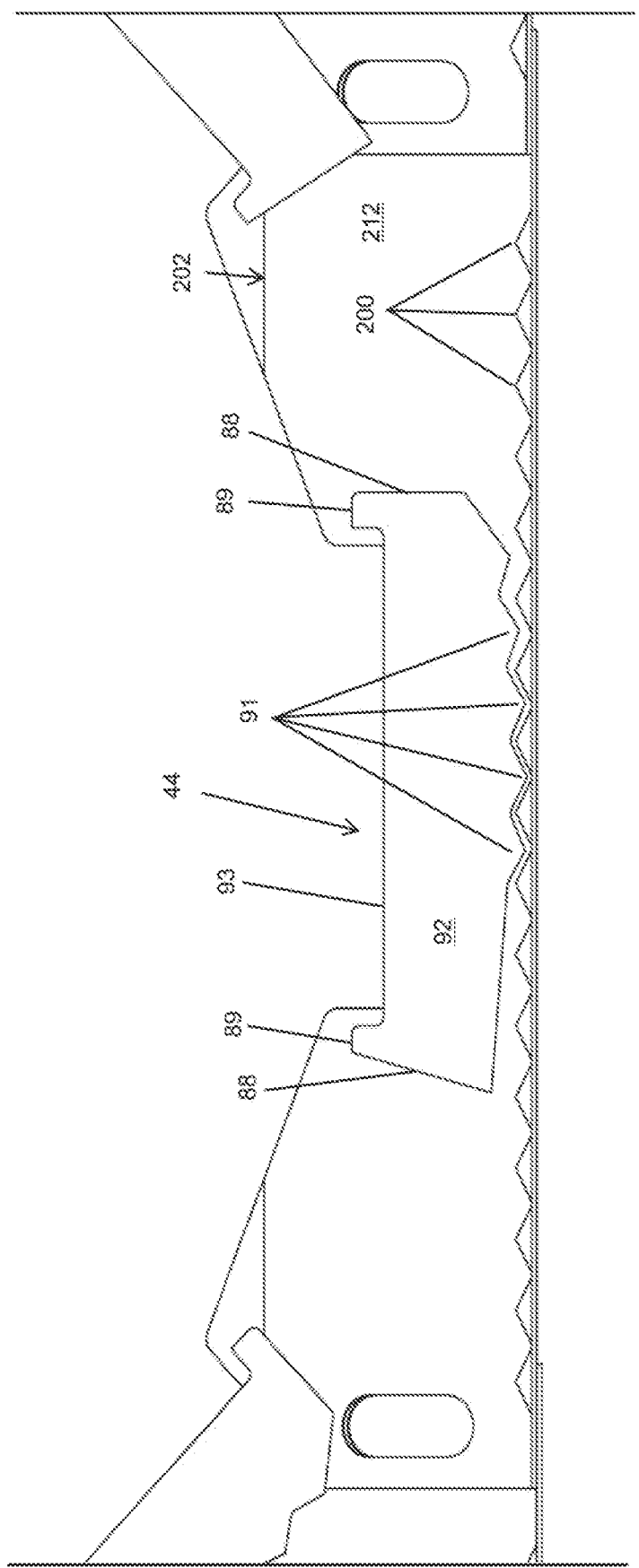
FIG. 25 is a close-up elevation view of FIG. 24.
Figure 26:
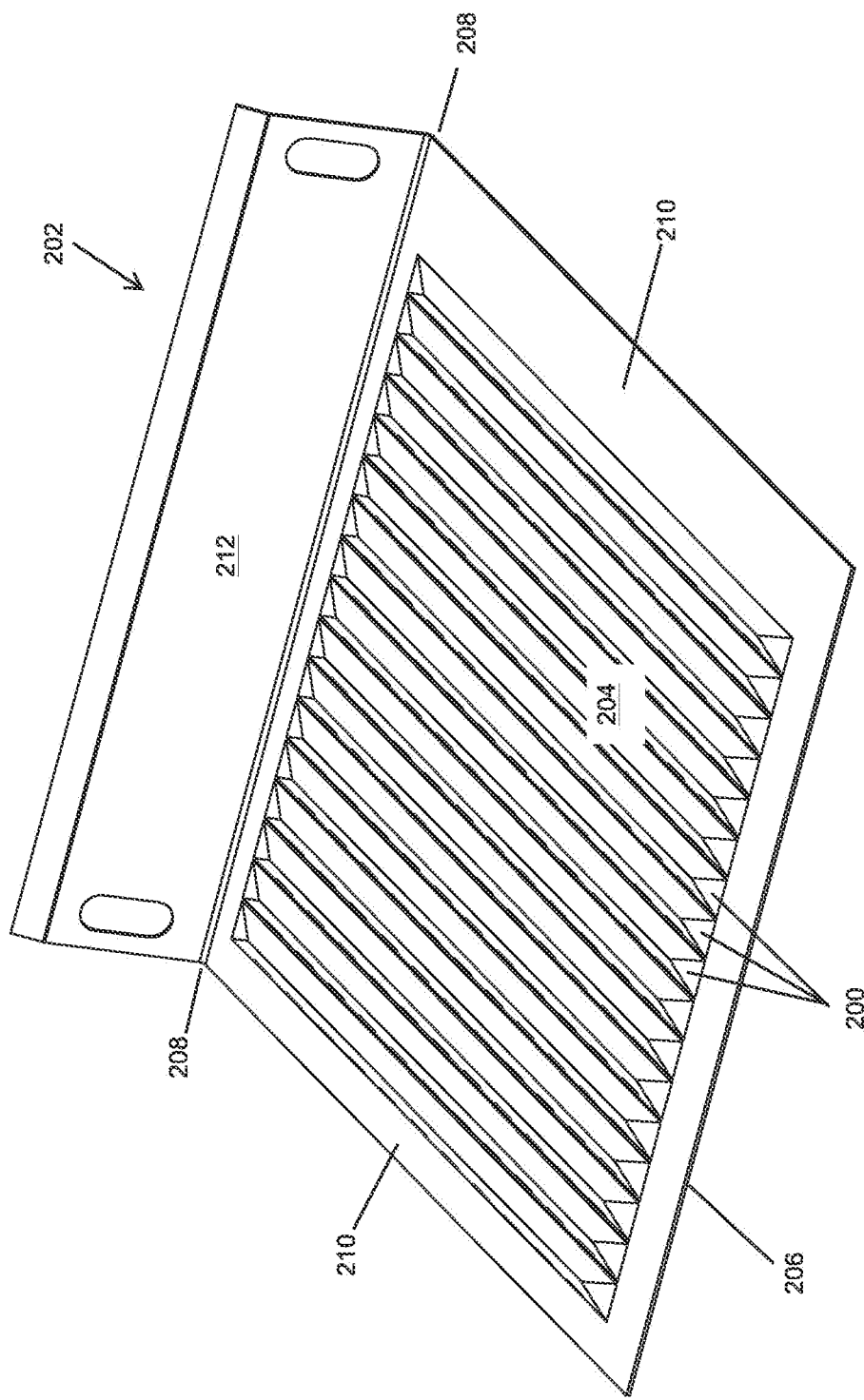
FIG. 26 is a perspective view of the upper surface of a panel of flashing used in association with a grain bin floor, the view showing the upper surface of the panel of flashing having a plurality of features that are configured to mesh with corresponding teeth in the feet of a sweep wheel.
Figure 27:
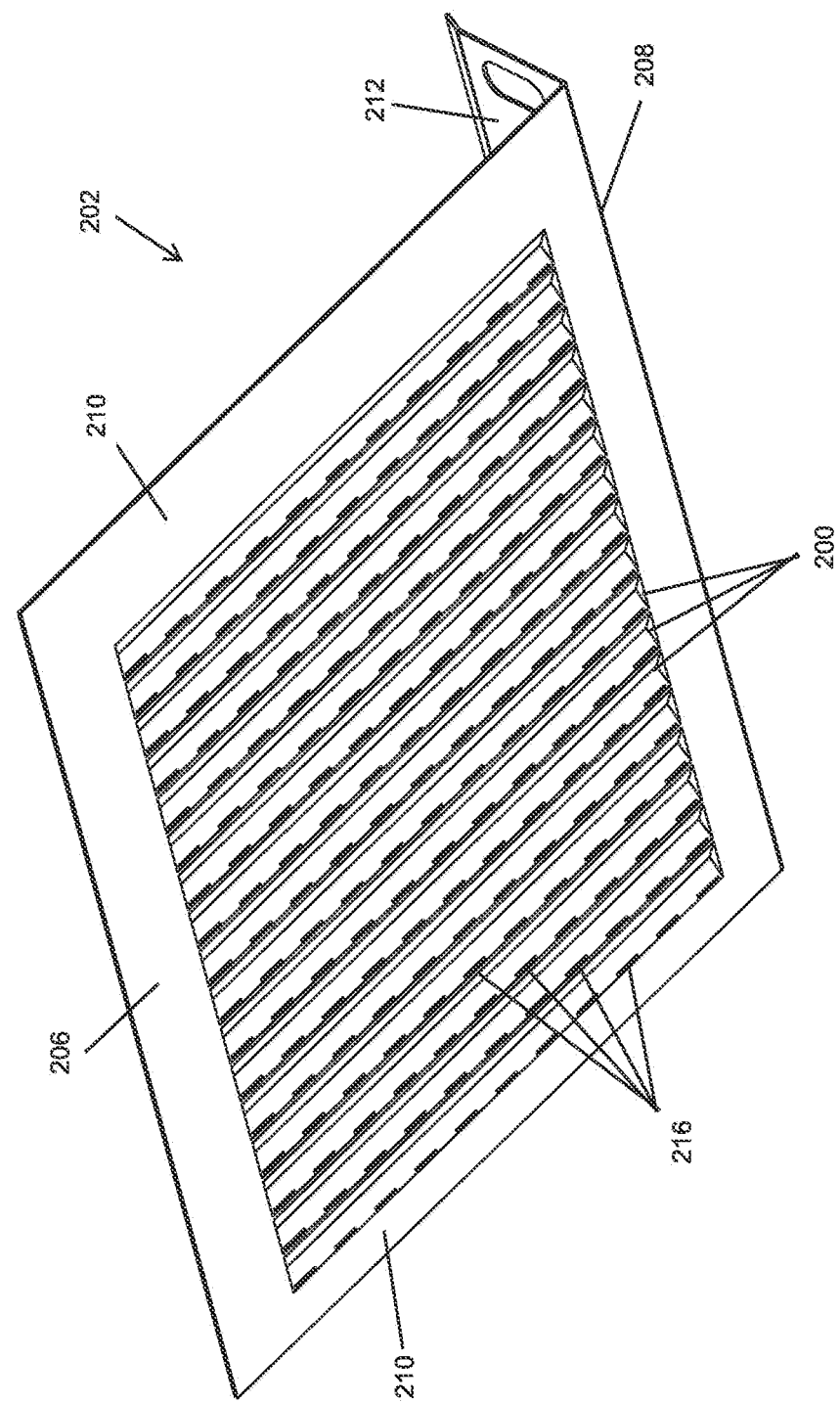
FIG. 27 is a perspective view of the lower surface of a panel of flashing used in association with a grain bin floor, the view showing the panel of flashing having a plurality of features that are configured to mesh with corresponding teeth in the feet of a sweep wheel.
Figure 28:
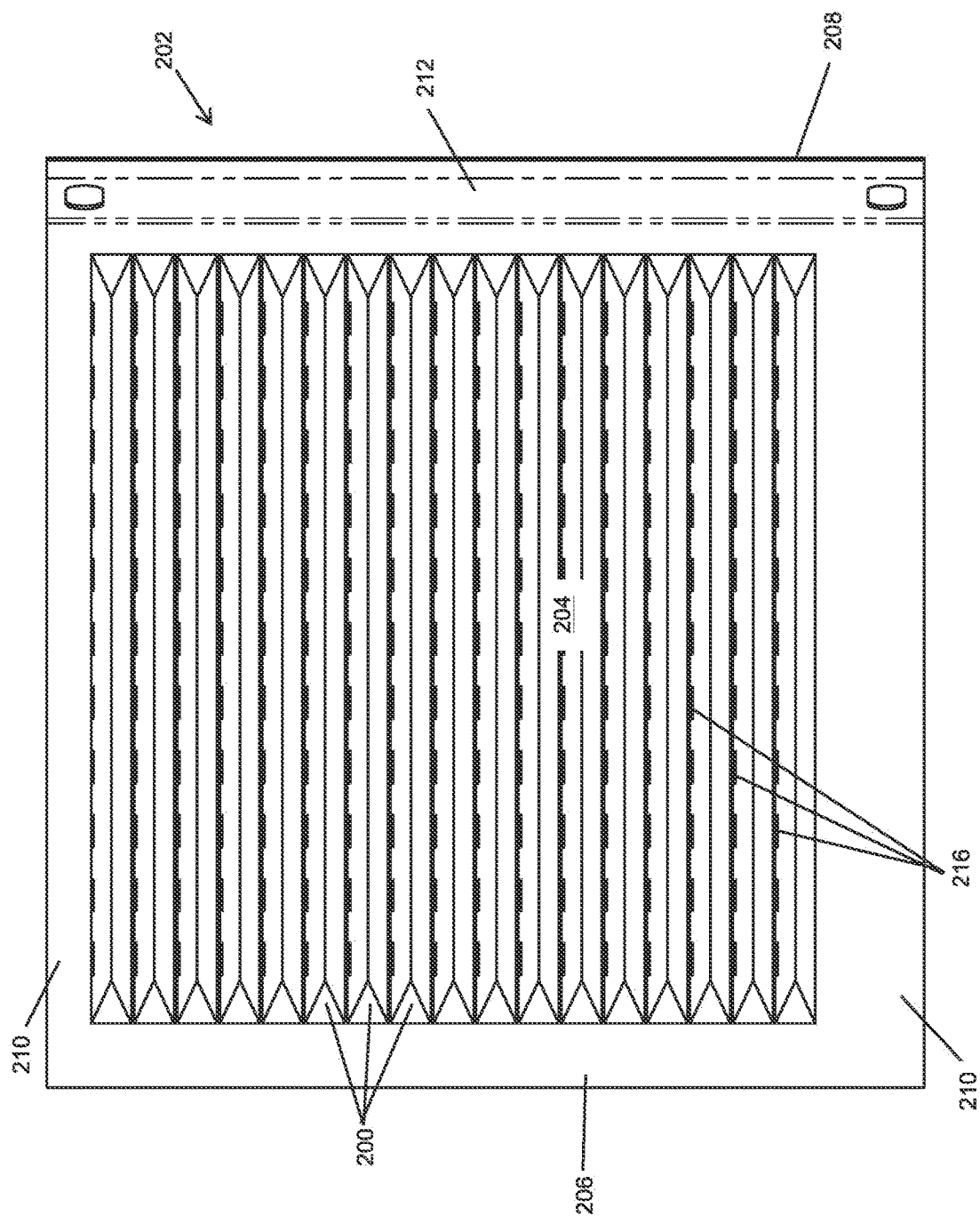
FIG. 28 is an elevation view of the upper surface of a panel of flashing used in association with a grain bin floor, the view showing the panel of flashing having a plurality of features that are configured to mesh with corresponding teeth in the feet of a sweep wheel.
Figure 29:
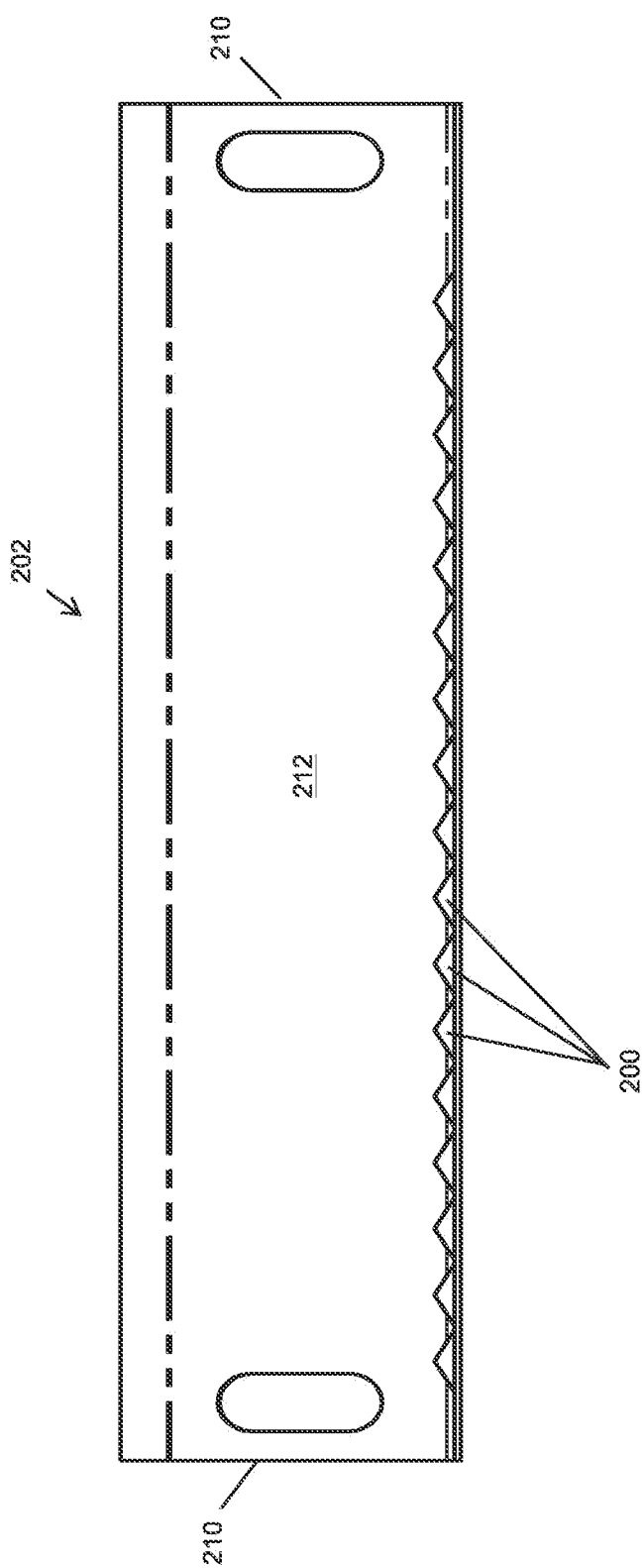
FIG. 29 is a side elevation view of a panel of flashing used in association with a grain bin floor, the view showing the panel of flashing having a plurality of features that are configured to mesh with corresponding teeth in the feet of a sweep wheel.
Figure 30:
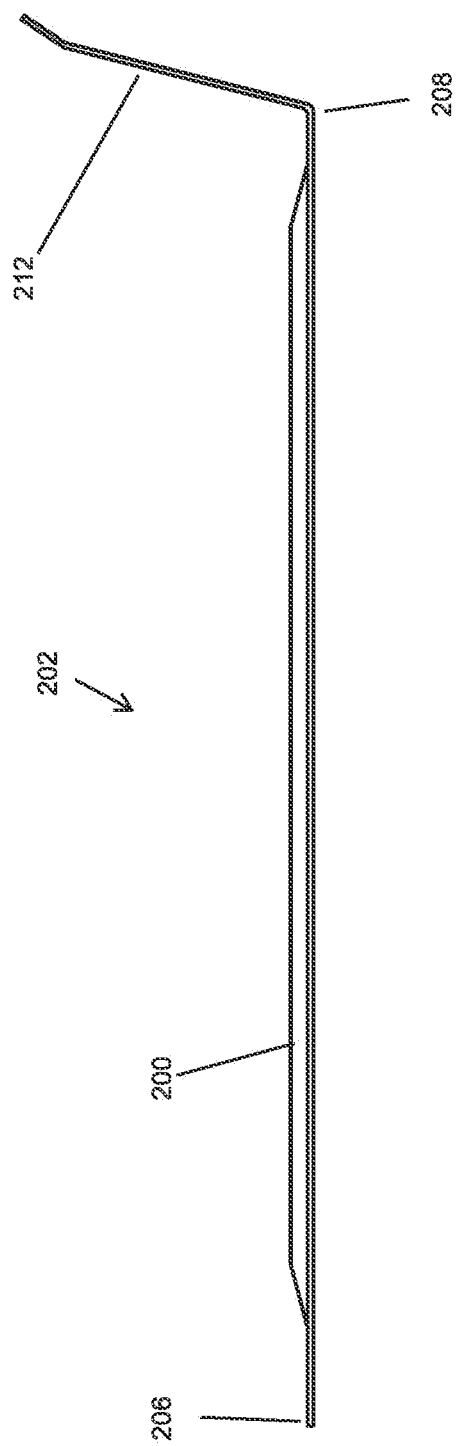
FIG. 30 is another side elevation view of a panel of flashing used in association with a grain bin floor, the view showing the panel of flashing having a plurality of features that are configured to mesh with corresponding teeth in the feet of a sweep wheel.

In the following detailed description, reference is made to the accompanying drawings which form a part hereof, and in which is shown by way of illustration specific embodiments in which various embodiments of the invention may be practiced. These embodiments are described in sufficient detail to enable those skilled in the art to practice the invention, and it is to be understood that other embodiments may be utilized and that mechanical, procedural, and other changes may be made without departing from the spirit and scope of the disclosure. The following detailed description is, therefore, not to be taken in a limiting sense, and the scope is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the disclosure.

While reference is made herein to use of the system in association with grain and a grain bin, the system and disclosure is not limited to use with grain and/or a grain bin. Instead, the system and methods presented herein can be used in any arrangement where granular or particulate material is to be moved, whether within a bin or other holding device.

With reference to the figures, a sweep auger system 10 (or system 10 or sweep auger 10) is presented. The sweep auger system 10 is shown in use with an exemplary grain bin 12 that includes foundation 14, sidewall 16, peaked roof 18, elevated floor 20, unload auger 22, transfer device 24, one or more sumps 26 and pivot point 28. System 10 also includes drive shaft 30, auger flighting 32, backboard 34, conduit 36, sweep wheel 38 having notches 40, arms 42 and feet 44, gearbox 46, drive shield 48, and a guide plate 50, among other components as is described further herein.

Grain Bin. In the arrangement shown, as one example, system 10 is used in association with a conventional grain bin 12. Grain bin 12 is generally cylindrical in shape and includes a foundation 14 positioned at its lower end, a sidewall 16 that extends upward from foundation 14 and a peaked roof 18 that covers the hollow interior formed by sidewall 16.

Grain bin 12 includes an elevated floor 20 positioned within the hollow interior of grain bin 12. Elevated floor 20 is positioned a distance above foundation 14. The upper surface of elevated floor 20 supports the grain within grain bin 12, while the space below the elevated floor 20 provides room for air flow as well as providing room for unload auger 22.

Unload auger 22 is any device which is configured to remove grain from grain bin 12. Unload auger 22 is positioned below one or more sumps 26 in elevated floor 20. In the arrangement shown, sumps 26 are doors in the elevated floor 20 that can be opened and closed. When opened, sumps 26 provide access for grain within grain bin 12 to reach unload auger 22.

Unload auger 22 is connected to transfer device 24 and transfers grain from sumps 26 to transfer device 24 (which in the arrangement shown is a vertical auger). Transfer device 24 is any device configured to receive grain from unload auger 22 and transfer the grain to another component. In one arrangement, transfer device 24 may be a transfer auger that transfers the grain to another bin, a dryer, a truck, a barge, a rail car, a leg, a belt, a conveyor, a gravity tube or any other device. In another arrangement, transfer device 24 may be a leg, a conveyor, a belt, a vertical auger, an unload auger, or any other device that is configured to move grain away from grain bin 12.

Grain bin 12 also includes a pivot point 28. Pivot point 28 is any connection point for sweep auger system 10 to connect to and rotate around. In one arrangement, as is shown, pivot point 28 is positioned at the center or approximately the center of elevated floor 20 and the inward end 54 of sweep auger system 10 connects to pivot point 28.

Sweep Auger System: Sweep auger system 10 is formed of any suitable size, shape and design and is configured to clean residual grain from grain bin 12 after as much grain has been removed using sumps 26 as is possible. In the arrangement shown, as one example, sweep auger system 10 extends a length from an inward end 54 to an outward end 56. Sweep auger system 10 includes a forward side 58, or leading edge, and a rearward side 60, or trailing edge. Sweep auger system 10 also includes an upper side 62 and a lower side 64.

The inward end 54 of sweep auger system 10 connects to pivot point 28 which facilitates rotation of sweep auger system 10 around the elevated floor 20 of grain bin 12. Sweep auger system 10 includes a drive shaft 30, auger flighting 32, backboard 34 and conduit 36 that extends all or a portion of the distance between the inward end 54 of sweep auger system 10 to the outward end 56 of sweep auger system 10, as is further described herein. The outward end 56 of sweep auger system 10 includes sweep wheel 38 having notches 40, arms 42 and feet 44, gearbox 46, drive shield 48, and guide plate 50, as is further described herein.

Drive Shaft: Drive shaft 30 is formed of any suitable size, shape and design and is configured to transfer rotation along all or a part of the length of auger system 10. In the arrangement shown, as one example, drive shaft 30 is a generally circular shaped tube that extends all or a part of the length of sweep auger system 10 from inward end 54 to outward end 56. However, any other shaped member is hereby contemplated for use such as square, rectangular, hexagonal, or the like.

In the arrangement shown, the inward end 54 of drive shaft 30 operably connects to pivot point 28 of grain bin 12 which facilitates rotation of pivot point 28 around grain bin 12. In the arrangement shown, the outward end 56 of drive shaft 30 operably connects to the inward end of gearbox 46. Through this connection, drive shaft 30 transfers rotation to gearbox 46.

In the arrangement shown, auger fighting 32 is connected to and extends around drive shaft 30 in a generally continuous helical nature. In this way, drive shaft 30 provides support for auger fighting 32 and a connection point for auger fighting 32. As drive shaft 30 rotates, so rotates auger flighting 32.

Drive shaft 30, and auger fighting 32, may be formed of a single continuous member between inward end 54 and outward end 56. Alternatively, drive shaft 30 and auger flighting 32 may be formed of a plurality of lengths that are connected together to form the desired length between inward end 54 and outward end 56.

Drive shaft 30 is connected to backboard 34 by a plurality of brackets 66. These brackets 66 provide support for drive shaft 30 while allowing for the needed rotation of drive shaft 30. The outer bracket 68 operatively connects backboard 34 to an inward surface of gearbox 46. In this way, outer bracket 68 provides support, strength and rigidity to gearbox 46 as well as drive shaft 30. In one arrangement, as is shown, breaks in the auger flighting 32 are positioned at brackets 66 and outer bracket 68. Drive shaft 30 rotates around a first axis of rotation 70 that extends through approximately the center of drive shaft 30 and connects to an input of gearbox 46.

Auger Flighting: Auger flighting 32 is formed of any suitable size, shape and design and is configured to rotate with drive shaft 30 and carry grain towards pivot point 28 and the center of grain bin 12. In the arrangement shown, as one example, auger fighting 32 is formed of a thin layer of material that extends around drive shaft 30 in a helical manner. In the arrangement shown, auger fighting 32 connects at its inward end to the exterior surface of drive shaft 30 and extends outwards a distance therefrom. Like drive shaft 30, auger fighting 32 rotates around a first axis of rotation 70 that extends through approximately the center of drive shaft 30.

Backboard: Backboard 34 is formed of any suitable size, shape and design and is configured to provide support for the length of sweep auger system 10 as well as to provide a rearward stop for grain that is conveyed by sweep auger system 10. In the arrangement shown, as one example, backboard 34 is formed of a generally rectangular shaped elongated member having a center wall 72, end walls 74 and rear wall portions 76. However, any other shape or configuration is hereby contemplated for use as backboard 34, such as a curved wall that surrounds a portion of drive shaft 30 and auger fighting 32, a plurality of straight walls connected in angled alignment to one another, or any other shaped member.

Center wall 72 is generally flat and extends from inward end 54 to outward end 56. In the arrangement shown, center wall 72 extends in a generally vertical manner. The upper and lower edges of center wall 72 connect to the forward edge of end walls 74 which extend rearward therefrom. End walls 74, like center wall 72, are generally flat in shape and extend from inward end 54 to outward end 56. Opposing end walls 74 extend in approximate parallel spaced relation to one another, and extend in approximate perpendicular alignment to center wall 72.

The rearward edges of end walls 74 connect to rear wall portions 76 which extend inward a distance toward one another. Rear wall portions 76, like end walls 74 and center wall 72, are generally flat and square in shape and extend from inward end 54 to outward end 56. Opposing rear wall portions 76 extend in approximate planar relation to one another with a space positioned between their inward ends. In this way, rear wall portions 76 form only a part or portion of center wall 72 and leave the rearward side of backboard 34 partially open thereby providing access to the interior of backboard 34, or more specifically the rearward side of center wall 72 and the interior surfaces of opposing end walls 74. Rear wall portions 76 extend in approximate parallel spaced alignment to center wall 72 and extend in approximate perpendicular alignment to end walls 74.

In the arrangement shown, the combination of center wall 72, end walls 74 and rear wall portions 76 form a C-shaped channel or a rectangular channel with a slot positioned in its rearward wall when viewed from its end. This combination of features provides backboard 34 with the needed strength and rigidity to strengthen the auger sweep system 10. However, any other shaped structural member is hereby contemplated for use as backboard 34 such an I-beam, a wide flange beam, a ninety degree angle bar, a Z-bar, a C-channel, an L-bar, solid bar, a solid plate, a combination of members that form a frame, or the like or any combination thereof.

In the arrangement shown, the forward surface of center wall 72 is positioned just rearward a distance from auger fighting 32. In this way, as drive shaft 30 and auger flighting 32 rotate, this causes grain to move toward pivot point 28. The grain is prevented from moving rearward of sweep auger system 10 by backboard 34. As such, the presence of backboard 34 helps to move grain toward pivot point 28.

Outer bracket 68 is connected to the outward end 56 of backboard 34. Outer bracket 68 connects to the forward surface of center wall 72 of backboard 34, as well as to the inward surface of gearbox 46 adjacent outward end 56 of drive shaft 30 and auger flighting 32.

The lower end of backboard 34 terminates a small distance above elevated floor 20 and the lower most edge of sweep wheel 38. While this gap allows some grain to slide past sweep auger system 10 by fitting under backboard 34, this gap provides clearance to allow sweep auger system 10 to rotate around pivot point 28.

Conduit 36 is positioned rearward of backboard 34 and is connected to backboard 34 by a plurality of brackets 78.

Conduit: Conduit 36 is formed of any suitable size, shape and design and is configured to provide additional structural strength and rigidity to the auger sweep system 10 as well as to connect components of the sweep auger system 10 to one another. In the arrangement shown, as one example, conduit 36 is formed of an elongated hollow tube that is generally square or rectangular in shape. However, any other shaped structural member is hereby contemplated for use conduit 36 such an I-beam, a wide flange beam, a ninety degree angle bar, a Z-bar, a C-channel, an L-bar, a cylindrical pipe, a solid bar, a solid rod, a combination of members that form a frame, or the like or any combination thereof.

Conduit 36 extends from its inward end 54 to its outward end 56 and is formed of a single continuous member between inward end 54 and outward end 56. Alternatively, conduit 36 may be formed of a plurality of lengths that are connected together to form the desired length between inward end 54 and outward end 56. Conduit 36 connects to backboard 34 by a plurality of brackets 78 spaced along the length of conduit 36.

In the arrangement shown, as one example, brackets 78 include a rearward wall 80 that connects at its upper and lower edges to angled wall 82. The forward most edge of angled wall 82 connect to tabs 84. In the arrangement shown, as one example, rearward wall 80 extends in a generally vertical plane. The rearward surface of rearward wall 80 connects to the forward surface of conduit 36. In one arrangement, conduit 36 is welded to rearward wall 80, however any other manner or method of connecting two components together is hereby contemplated for use for connecting conduit 36 to rearward wall 80 such as screwing, bolting, welding, soldering, snap fitting or the like.

In the arrangement shown, as one example, the upper and lower edges of rearward wall 80 connect to the rearward edges of angled wall 82. Angled walls 82 angle outward away from each other as they extend forward toward backboard 34. The forward most edges of angled walls 82 connect to the rearward edges of tabs 84. In the arrangement shown, as one example, tabs 84 extend in approximate parallel spaced relation to one another and are configured to connect to and extend along the exterior surface of end walls 74 of backboard 34. Once connected in this manner, tabs 84 are bolted to end walls 74, however any other manner or method of connecting two components together is hereby contemplated for use, such as welding, soldering, screwing, snap fitting or the like.

In the arrangement shown, as one example, the outward end 56 of conduit 36 also connects to the rearward surface of drive shield 48. In the arrangement shown, as one example, the drive shield 48 is connected directly to the conduit 36. In this way conduit 36 provides additional strength and rigidity to backboard 34, drive shield 48, and essentially all the other components of the sweep auger system 10.

Sweep Wheel: Sweep wheel 38 is formed of any suitable size, shape and design and is configured to rotate and engage the grain and/or the elevated floor 20 and drive sweep auger system 10 around pivot point 28. In the arrangement shown, as one example, when viewed from the forward side 58 or rearward side 60, sweep wheel 38 is generally planar in shape. In the arrangement shown, as one example, sweep wheel 38 has a generally circular exterior shape.

In the arrangement shown, as one example, the exterior periphery of sweep wheel 38 includes a pattern of notches 40 that are separated by arms 42 that include feet 44 thereon. Notches 40, arms 42 and feet 44 may be formed of any suitable size, shape and design that facilitates suitable agitation of grain and provides suitable driving force. In the arrangement shown, as one example, when viewed from the side, notches 40 have a generally flat and straight wall that connects at its outward edges to arms 42. Arms 42 have generally flat and straight opposing sides or walls that extend in approximate parallel spaced relation to one another that terminate in a generally flat or straight end. In the arrangement shown, the wall that defines notches 40 and the wall that defines arms 42 connect to one another at slightly greater than a ninety degree angle, such that the arms 42 taper ever so slightly narrower as they extend away from notches 40. However any other arrangement is hereby contemplated for use.

Initially, arms 42 extend outward from notches 40 in a generally flat and planar arrangement. After extending away from the wall of notches 40 a distance, arms 42 bend inward at corners 86. In the arrangement shown, as one example, arms 42 extend inward at approximately a ninety degree angle to the plane of main body of sweep wheel 38, however any other arrangement is hereby contemplated for use.

Feet 44 are formed of any suitable size, shape and design and are configured to be connected to the outward ends of arms 42 and to provide traction to sweep wheel 38 and to agitate the grain. In the arrangement shown, as one example, when viewed from the side, feet 44 include generally flat and square leading and trailing edges 88 that connect at their outward ends to an exterior wall 90.

In the arrangement shown, as one example, the leading and trailing edges 88 of feet 44 extend in approximate parallel spaced relation to one another and form a wall that extends in approximate perpendicular alignment to the exterior circumference of the circular shape of sweep wheel 38. The generally flat and square wall of leading edge 88, and its approximate perpendicular alignment to the exterior circumference of the circular shape of sweep wheel 38, has a tendency to engage the grain and agitate the grain. As such, when the leading edge 88 of feet 44 engages the grain, grain tends to be carried by the sweep wheel 38 rearward, as is further described herein.

In the arrangement shown, as one example, the exterior wall 90 of feet 44 connect at its forward edge to the outward edge of leading edge 88 and connect at its rearward edge to the outward edge of trailing edge 88. When viewed from the side, exterior wall 90 is generally flat and straight and extends in approximate perpendicular alignment to the planes established by leading and trailing edges 88. In one arrangement, exterior wall 90 includes a plurality of features which are any device or structure that helps to increase the friction and drive provided by sweep wheel 38. In the arrangement shown, as one example, the features in the exterior wall 90 of feet 44 are a plurality of teeth 91 that extend across the exterior wall 90 of feet 44 from its interior edge to its exterior edge. In the arrangement shown, as one example, these teeth 91 extend in approximate perpendicular alignment to the sides 92 of feet 44, and extend in approximate parallel spaced alignment to the leading and trailing edges 88 of feet 44, as well as in parallel alignment to the axis of rotation of the drive shaft 30. However any other arrangement is hereby contemplated for use, such as angled grooves, protruding features, recesses or the like or any other feature that increases friction and engagement with the grain over a smooth surface.

In one arrangement, as one example, when viewed from the side, along the axis of rotation of drive shaft 30, the teeth 91 have a pair of planar faces that angle away from exterior wall 90 and toward one another to form a peak that rises above the exterior wall 90. In the arrangement shown, both sides of the peak of teeth 91 are equal, thereby forming a series of isosceles triangles. In one arrangement, the plurality of teeth 91 are similarly or identically shaped to one another thereby forming a series of similar or identical peaks and valleys.

In one arrangement, the forward or leading portion of exterior wall 90 is generally flat and planar and does not include any teeth 91 thereon. In this arrangement, teeth 91 rise out of this flat planar section and form a series of peaks and valleys just rearward of this flat planar section. In an alternative arrangement, teeth 91 extend across the entirety of exterior wall 90 or any other portion of exterior wall 90.

In one arrangement, as is shown, teeth 91 are configured to mesh or engage with similarly shaped features 200 in flashing 202 of elevated floor 20, as is further described herein.

In one arrangement, as is shown, to extend the surface area of edges 88, the outward edges of feet 44 include extensions 89 that extend away from exterior wall 90 and toward the axis of rotation of drive shaft 30 a distance. These extensions 89 extend past interior wall 93 of feet 44 a distance in approximate planar alignment with the plane of edges 88. In the arrangement shown, interior wall 93 and exterior wall 90 extend in approximate planar spaced relation with one another. In this way, a recess is formed between opposing extensions 89 and interior wall 93. The addition of extensions 89 to feet 44 increases the agitation and movement of grain, whereas the addition of teeth 91 increases the friction and/or grip and/or traction generated by feet 44.

In the arrangement shown, as one example, when viewed from the forward side 58, or rearward side 60, the sides 92 of feet 44 are generally flat and extend in approximate planar alignment to one another. In the arrangement shown, as one example, when viewed from the forward side 58, or rearward side 60, the sides 92 of feet 44 extend in approximate perpendicular alignment to the leading and trailing edges 88 of feet 44. In the arrangement shown, as one example, when viewed from the forward side 58, or rearward side 60, the sides 92 of feet 44 extend in approximate perpendicular alignment to the exterior wall 90 and interior wall 93 of feet 44.

In one arrangement, feet 44 are formed of a composite material, such as a plastic, rubber, a urethane material, or other non-metallic material whereas the other portions of sweep wheel 38 are formed of a metallic material. In one arrangement, feet 44 are molded directly onto arms 42 of sweep wheel 38, whereas in another arrangement feet 44 are connected to arms 42 by any other manner, method or means such as friction fitting, gluing, welding, adhering, bolting, screwing, snap fitting or any other manner of connecting two components together. By forming feet 44 out of a non-metallic material this provides some give, cushion and/or shock-absorption properties to sweep wheel 38 and reduces some of the wear that metal-on-metal engagement can cause. However, care is taken to select a non-metallic material that has adequate material properties, such as strength, hardness, durability and coefficient of friction, to name a few.

Sweep wheel 38 connects to gearbox 46 at output shaft 94 that forms a second axis of rotation 96 which, in the arrangement shown, is spaced a distance above and rearward of the first axis of rotation 70 that engages drive shaft 30. In the arrangement shown, as one example, sweep wheel 38 includes a mounting feature 98 which is positioned approximately at the center of sweep wheel 38. In the arrangement shown, mounting feature 98 is a generally elongated slot that engages a similarly shaped feature in the outward end of output shaft 94 of gearbox 46, however any other shaped feature is hereby contemplated for use. The engagement between the mounting feature 98 of sweep wheel 38 with the output shaft 94 of gearbox 46 facilitates rotation of sweep wheel 38 when output shaft 94 rotates.

Gearbox: Gearbox 46 is formed of any suitable size, shape and design and is configured to receive rotational input from drive shaft 30 at one speed and output rotation on sweep wheel 38 at a second rotational speed. In one arrangement, it is desirable to have drive shaft 30 rotate at a higher rotational speed than the sweep wheel 38 and in this arrangement gearbox 46 serves as a reduction gearbox. Alternatively, in another arrangement, it may be desirable to have the sweep wheel 38 rotate at a higher rotational speed than the drive shaft and in this arrangement gearbox 46 serves as a multiplier gearbox.

In the arrangement shown, as one example, gearbox 46 has a housing that includes a plurality of gears (not shown) that provide the desired change in rotational speed between first axis of rotation 70 (or input) and second axis of rotation 96 (or output). The inward end of gearbox 46 connects to the outward end of drive shaft 30 at first axis of rotation 70 (or input). The outward end of gearbox 46 includes an output shaft 94 that connects to the inward side of sweep wheel 38 at second axis of rotation 96 (or output). In the arrangement shown, as one example, second axis of rotation 96 is positioned a distance above and rearward of first axis of rotation 70. This arrangement allows the diameter of sweep wheel 38 to be larger than the diameter of auger fighting 32. The larger diameter sweep wheel 38 allows for improved traction and appropriate grain agitation.

In the arrangement shown, as one example, gearbox 46 is connected to the outward end 56 of backboard 34 by outer bracket 68 that includes a rearward flange 100 and a forward flange 102. Rearward flange 100 and forward flange 102 are generally planar in shape and extend in approximate perpendicular alignment to one another. In the arrangement shown, rearward flange 100 connects to the outward end 56 of the forward surface of center wall 72 of backboard 34 in generally flat and flush engaging alignment. The forward flange 102 extends forward from rearward flange 100 and connects to the inward surface of gearbox 46. Rearward flange 100 includes a plurality of openings that receive bolts therein that connect rearward flange 100 to backboard 34. Similarly, forward flange 102 includes a plurality of openings that receive bolts therein that connect forward flange 102 to gearbox 46. Forward flange 102 also includes openings therein to receive features around first axis of rotation 70 and second axis of rotation 96.

Drive shield 48 as well as guide plate 50 are also connected to gearbox 46.

Drive Shield: Drive shield 48 (also referred to as fender 48) is formed of any suitable size, shape and design and is configured to capture grain that is agitated by the sweep wheel 38 and is configured to facilitate the return of this agitated grain into the path of the sweep auger system 10 so that it may be removed by the sweep auger system 10 instead of being left behind. In the arrangement shown, as one example, drive shield 48 is formed of an inner portion 104 and an outer portion 106 that when viewed from above or below forms a channel 108 that extends vertically. The rearward portion of sweep wheel 38 rotates within this channel 108. This channel 108 serves to capture grain as the sweep auger system 10 moves forward and the sweep wheel 38 spins therein. As the sweep wheel 38 rotates, grain piles up within channel 108. Once the level of the grain is above the gearbox 46 and guide plate 50, the grain flows by gravity over the gearbox 46 and guide plate 50 and into the path of sweep auger system 10.

In the arrangement shown, as one example, the inner portion 104 of drive shield 48 includes a forward flange 110 that connects to a first section 112 that connects to an angled wall 114 that connects to a back wall 116 that connects to a rearward flange 118 of outer portion 106. When viewed from above or below forward flange 110, first section 112, angled wall 114 and rearward flange 118 extend in a generally flat and straight manner from their upper edge to their lower edge.

In the arrangement shown, as one example, forward flange 110 is generally flat and straight from its upper edge to its lower edge. Forward flange 110 includes a plurality of features or cut-outs therein that provide clearance for components of the system 10, such as the walls of backboard 34. When drive shield 48 is in place on the outward end 56 of backboard 34 the upper portion 120 of forward flange 110 is positioned above the upper surface of backboard 34 and extends inward a distance therefrom in approximate parallel spaced relation to the forward surface of center wall 72. In this way, the upper portion 120 of forward flange 110 of drive shield 48 provides added surface area that serves to help to maintain flying or bouncing grain in front of sweep auger system 10.

Similarly, when drive shield 48 is in place on the outward end 56 of backboard 34 the lower portion 122 of forward flange 110 is positioned below the lower surface of backboard 34 and extends inward a distance therefrom in approximate parallel spaced relation to the forward surface of center wall 72. In this way, the lower portion 122 of forward flange 110 of drive shield 48 provides added surface area that serves to help to maintain grain in front of sweep auger system 10 and serves to prevent excess grain from flowing out and under drive shield 48.

In one arrangement, forward flange 110 connects adjacent the forward surface, or alternatively the rearward surface, of center wall 72 of backboard 34 by one or more bolts. In one arrangement the bolts that connect rearward flange 100 of outer bracket 68 to backboard 34 also connect forward flange 110 to backboard 34. In another arrangement, while the forward flange 110 may be positioned in close proximity to, or even frictional engagement to backboard 34, forward flange 110 may be free with respect to backboard 34 and backboard 34 and forward flange 110 may be allowed to have a certain amount of relative movement or give with respect to one another. The inward edge of forward flange 110 connects to the forward edge of first section 112.

In the arrangement shown, as one example, first section 112 is generally flat and straight as it extends from its upper edge to its lower edge. The forward edge of first section 112 connects to the inward edge of forward flange 110. First section 112 extends rearward from forward flange 110 in approximate perpendicular alignment to forward flange 110. First section 112 includes a plurality of openings that facilitate the passage of bolts through first section 112 and into gearbox 46 thereby connecting first section 112, and drive shield 48 in general, to gearbox 46. The rearward edge of first section 112 connects to the forward edge of angled wall 114.

In the arrangement shown, as one example, angled wall 114 is generally flat and straight as it extends from its upper edge to its lower edge. The forward edge of angled wall 114 connects to the rearward edge of first section 112. Angled wall 114 extends rearward from the rearward edge of first section 112 as it extends outward at an angle. The rearward edge of angled wall 114 connects to the inward edge of back wall 116.

In the arrangement shown, as one example, back wall 116 is generally flat and straight as it extends from its upper edge to its lower edge. The inward edge of back wall 116 connects to the rearward edge of angled wall 114. The plane formed by back wall 116 extends in approximate parallel spaced relation to the plane of forward flange 110 as well as extending in parallel spaced relation to the axis of rotation of drive shaft 30 and the length of conduit 36. Back wall 116 includes a plurality of openings that facilitate the passage of bolts through back wall 116 and into conduit 36 thereby connecting back wall 116, and drive shield 48 in general, to conduit 36 thereby providing additional strength and rigidity to drive shield 48. Alternatively the rearward surface of back wall 116 is welded to the forward surface of conduit 36 or alternatively the two components are connected together by any other manner, method or means.

In the arrangement shown, as one example, outer portion 106 includes rearward flange 118. In the arrangement shown, as one example, rearward flange 118 is generally flat and straight as it extends from its upper edge to its lower edge. The outward edge of rearward flange 118 connects to the rearward edge of outer portion 106. The plane formed by rearward flange 118 extends in approximate perpendicular alignment to the plane outer portion 106, and extends in approximate parallel spaced relation to the plane formed by first section 112. Rearward flange 118 includes a plurality of openings that facilitate the passage of bolts through rearward flange 118 and back wall 116.

In the arrangement shown, as one example, outer portion 106 is generally flat and straight from its upper edge to its lower edge. The rearward edge of outer portion 106 connects to the rearward flange 118. The plane formed by outer portion 106 extends in approximate perpendicular alignment to the plane of rearward flange 118. In use, when assembled, the back wall 116 of inner portion 104 is positioned in overlapping condition with the rearward flange 118 of outer portion 106 and they are connected together in overlapping engagement with one another. The rearward flange 118 of outer portion 106 includes a plurality of openings that facilitate the passage of bolts through rearward flange 118 of outer portion 106 and back wall 116 of inner portion 104 thereby connecting the two components together.

Outer portion 106 defines the outer wall or boundary of the pocket formed by drive shield 48. In this way, outer portion 106 helps to keep grain within the pocket formed by drive shield 48 and prevents grain from spilling out the outward end 56 of sweep auger system 10.

In the arrangement shown, inner portion 104 and outer portion 106 are formed of separate pieces of material, inner portion 104 and outer portion 106 may be formed of different materials. In one arrangement, inner portion 104 is formed of a metallic material while outer portion 106 is formed of a composite material or non-metallic material, such as an ultra high molecular weight polyethylene (UHMW) or another plastic or non-metallic material and/or composite material. The use of a composite material (such as UHMW) for outer portion 106 provides the benefits of being extremely durable, and in some cases self-lubricating, while also being more forgiving when engaging metallic parts, such as the sidewall 16 of grain bin 12. Alternatively, it is hereby contemplated that drive shield 48 may be formed of a single unitary piece (thereby obviating the need for inner portion 104 and outer portion 106) that is formed of a single material, such as metal or composite, or any other number of pieces that are connected together that may be formed of the same or different materials.

The forward edge of outer portion 106 includes a slot 124 that forms an opening 126. Opening 126 is configured to receive washer 128 therein.

Washer 128 is generally circular in shape and includes an opening at approximately their middle. This opening receives a shaft of bolt 130 there through. Bolt 130 extends through the opening in washer 128 and sweep wheel 38 and threads into the outward end of output shaft 94 of gearbox 46. In this way, as output shaft 94 rotates so rotates sweep wheel 38 and washer 128.

In one arrangement, to help prevent outer potion 106 of drive shield 48 from bowing outward during use, additional structural members are connected to, and/or placed outside of the outer side of outer portion 106. These structural members provide additional support for the extended plane of outer portion 106 and prevents outer portion 106 from excessively bowing or bending outward under pressure, which can lead to failure. In this way, the placement, installation and use of these additional structural members help to maintain the shape and dimensions of drive shield 48 and therefore helps the sweep auger system 10 to function as intended. In one arrangement, as one example, one form of a structural support member is an bar, plate or other component that connects and/or extends between the upper edges of inner portion 104 and outer portion 106. In another arrangement, a hood or cover is placed over the upper end of inner portion 104 and outer portion 106 which encloses the upper end of channel 108 and which facilitates the strengthening of the drive shield 48 and prevents the bowing of outer portion 106. This arrangement also captures upwardly flying grain and keeps this flying grain within channel 108. However, any other form of support is hereby contemplated for use.

Guide Plate: Guide plate 50 is formed of any suitable size, shape and design and is configured to guide grain captured within the channel 108 of drive shield 48 back in front of the path of sweep auger system 10 so that the grain can be moved by auger fighting 32 to a sump 26. In the arrangement shown, as one example, guide plate 50 covers a portion of gearbox 46 and includes a rearward section 132, a center section 134, a forward section 136, an inner flange 138 and an outer flange 140. In the arrangement shown, as one example, guide plate 50 angles from its outward edge downward toward its inward edge so as to direct grain flowing out of the channel 108 back in front of the path of sweep auger system 10 and toward auger fighting 32.

In the arrangement shown, as one example, rearward section 132 of guide plate 50 is generally planar in shape and extends from an outward edge to an inward edge, wherein the outward edge is higher than the lower inward edge. The rearward edge of rearward section 132 engages or is in close proximity to the upper surface of gearbox 46. Rearward section 132 extends from its rearward edge upward at an angle before connecting to the rearward edge of center section 134 of guide plate 50. In this way, rearward section 132 provides a smooth ramp up and over a portion of gearbox 46 as well as helps to urge grain to slide by the force of gravity toward the outward end 56 of drive shaft 30 and auger fighting 32 and/or in front of the travel path of sweep auger system 10.

In the arrangement shown, as one example, center section 134 of guide plate 50 is generally planar in shape and extends from an outward edge to an inward edge, wherein the outward edge is higher than the lower inward edge. Center section 134 extends from its rearward edge which connects to the forward edge of rearward section 132, to its forward edge which connects to the rearward edge of forward section 136. Center section 134 angles slightly downward from its rearward edge to its forward edge. The combined angles of center section 134 of guide plate 50 helps to urge grain to slide by the force of gravity toward the outward end 56 of drive shaft 30 and auger flighting 32 and/or in front of the travel path of sweep auger system 10.

In the arrangement shown, as one example, forward section 136 of guide plate 50 is generally planar in shape and extends from an outward edge to an inward edge, wherein the outward edge is higher than the lower inward edge. Forward section 136 extends from its rearward edge which connects to the forward edge of center section 134, to its forward edge which terminates at or near the upper forward surface of gearbox 46. Forward section 136 angles slightly downward from its rearward edge to its forward edge. The combined angles of forward section 136 of guide plate 50 helps to urge grain to slide by the force of gravity toward the outward end 56 of drive shaft 30 and auger fighting 32 and/or in front of the travel path of sweep auger system 10.

In the arrangement shown, as one example, an inner flange 138 is connected to the inner edge of guide plate 50 and extends downward therefrom. In the arrangement shown, inner flange 138 includes a plurality of openings that facilitate connection of guide plate 50 to gearbox 46. In the arrangement shown, as one example inner flange 138 is only connected to forward section 136 and inner flange 138 is placed over a portion of forward flange 102 of outer bracket 68. In this arrangement, forward flange 102 of outer bracket 68 and inner flange 138 of drive shield are bolted simultaneously to gearbox 46. However connection to any other portion of guide plate 50 is hereby contemplated for use as is attachment to gearbox 46 by any other manner, method or means. In the arrangement shown, the inner flange 138, the rearward section 132, center section 134 and forward section 136 are formed of a single continuous piece with curves or fold lines separating and connecting the components together.

In the arrangement shown, as one example, an outer flange 140 is connected adjacent the outer edge of guide plate 50 and includes a plurality of features that are configured to engage the exterior surface of gearbox 46. As such, in the arrangement shown, as one example, the lower surface of outer flange 140 rests upon gearbox 46 or in close proximity thereto and provides support for guide plate 50. However connection or attachment by any other manner, method or means is hereby contemplated for use. In the arrangement shown, the outer flange 140 is a separate piece from inner flange 138, the rearward section 132, center section 134 and forward section 136 and is connected by way of a plurality of bolts or another manner, method or means to the other portions of guide plate 50. In an alternative arrangement outer flange 140 forms a continuous piece with inner flange 138, rearward section 132, center section 134 and forward section 136.

In Operation: Drive shield 48 is installed by placing the center portion of forward flange 110 in engagement with the outward end of the rearward surface of the center wall 72 of backboard 34. In this position, the upper portion 120 of forward flange 110 extends above the outward end of center wall 72 and the lower portion 122 of forward flange 110 extends below the outward end of center wall 72. The first section 112 of inner portion 104 of drive shield 48 is bolted to the inward edge of gearbox 46 and the back wall 116 of inner portion 104 of drive shield 48 is bolted to conduit 36.

Sweep wheel 38 is installed onto output shaft 94 such that the arms 42 extend inward over gearbox 46. Sweep wheel 38 is positioned within and rotates within the channel 108 formed by drive shield 48. Outer portion 106 of drive shield 48 is installed onto the inner portion 104 of drive shield 48 by overlapping the rearward flange 118 of outer portion 106 with the back wall 116 of inner portion 104 and bolting the two components together. Washer 128 is installed within opening 126 of outer portion 106 and bolt 130 is extended through, washer 128, sweep wheel 38 and into the threaded opening in the end of output shaft 94 and the components are tightened together such that as output shaft 94 rotates so rotates sweep wheel 38, washer 128, and bolt 130.

Guide plate 50 is installed onto gearbox 46 by passing bolts through the inner flange 138 and into gearbox 46 thereby connecting the two components together. When guide plate 50 is installed on gearbox 46 the rearward section 132, center section 134 and forward section 136 cover a portion of the gearbox 46 and the lower end of the outer flange 140 is in engagement with an upper exterior surface of gearbox 46.

Once assembled, when sweep auger system 10 is activated drive shaft 30 and auger fighting 32 rotate thereby forcing grain inward toward the center of grain bin 12. As the drive shaft 30 rotates this causes rotation of the gears within gearbox 46 which outputs rotation at output shaft 94. As output shaft 94 rotates, so rotates sweep wheel 38, washer 128, and bolt 130.

As sweep wheel 38 rotates the iterative passing of notches 40 and feet 44 agitate the grain. The rotation of sweep wheel 38 and the configuration of sweep wheel 38, notches 40, arms 42 and feet 44 have a tendency to move grain rearward as the sweep auger system 10 is propelled forward. As the sweep wheel 38 rotates within the channel 108 formed by drive shield 48 the pocket formed by drive shield 48 captures the grain within channel 108 and prevents the sweep wheel 38 from throwing the grain rearward. As the sweep wheel 38 rotates the grain piles up within channel 108 and the grain engages the generally flat and square leading edges 88 of feet 44 as well as the generally flat and square leading edges of arms 42. This engagement between these surfaces of sweep wheel 38 carries the grain upward within channel 108. As the level of grain reaches the guide plate 50 the configuration of the guide plate 50 urges the grain to drain over guide plate 50 and gearbox 46 by the force of gravity toward the outward end of drive shaft 30 and auger flighting 32 and/or in front of the path of sweep auger system 10. That is, when the level of grain within channel 108 reaches the guide plate 50 the shape and angle of guide plate 50 causes the grain to fall over gearbox 46 and into an area where sweep auger system 10 is capable of moving the grain inward.

In this way, the use of drive shield 48 and guide plate 50 capture grain that otherwise would have been left behind by a conventional sweep auger. It has been tested that use of the sweep auger system 10 similar in ways to embodiments presented herein reduces the amount of grain left behind by a conventional sweep auger by over 80%.

One of the benefits of the system 10 is that close tolerances between the rotating sweep wheel 38 and the drive shield 48 are not required to provide excellent performance. Instead, the drive shield 48 provides an ample amount of clearance for sweep wheel 38 to rotate within the channel 108 formed by drive shield 48. This allows for the passage of large clumps of grain therein and there through. Or, said another way, when clumps of grain are encountered by the sweep wheel 38 they do not get caught between close tolerances between the sweep wheel 38 and the drive shield 48, whereas in prior art systems when a clump is encountered it can get caught or jammed between the sweep wheel and other components of the prior art system which can break the system or prevent unloading until it is manually cleaned. As such, the ample amount of clearance provided for in the system 10 presented herein provides for greater durability and robustness and allows the system 10 to operate even when clumps are encountered.

Corresponding Teeth in Feet and Features in Elevated Floor: In one arrangement, to increase friction and traction between sweep wheel 38 and elevated floor 20, feet 44 include teeth 91 that mesh or mate with or engage features 200 in elevated floor 20. In one arrangement, as one example, when viewed from the side, along the axis of rotation of drive shaft 48, the exterior wall 90 of feet 44 include teeth 91. Teeth 91 may be formed of any suitable size, shape and design and represent a protrusion or change in what is otherwise a planar surface of exterior wall 90. These teeth 91 are configured to impart increased friction, traction or resistance as opposed to a smooth or flat surface of exterior wall 90.

In one arrangement, as is shown, when viewed from the side along the axis of rotation of drive shaft 30, teeth 91 are triangular in shape or angled in shape. That is, in this arrangement, teeth 91 have a pair of flat (however curved is also contemplated) planar faces that angle away from exterior wall 90 and toward one another to form a peak that rises above the plane of exterior wall 90. In the arrangement shown, as one example, both sides of the peak of teeth 91 are approximately equal, in this way a plurality of teeth 91 form a series of isosceles triangles along exterior wall 90. In one arrangement, the plurality of teeth 91 are similarly or identically shaped to one another thereby forming a series of similar or identical peaks and valleys that extend in a continuous manner across a portion of or the entire exterior wall 90 of feet 44. That is, in one arrangement, teeth 91 form a continuous pattern wherein the plane of each tooth 91 connects to a peek on one end and a valley on the opposite end.

In one arrangement, the forward edge or leading edge of exterior wall 90 is generally flat and planar and does not include any teeth 91 thereon. In this arrangement, teeth 91 rise out of this flat planar section and form a series of peaks and valleys just rearward of this flat planar section. In an alternative arrangement, teeth 91 extend across the entirety of exterior wall 90 or any other portion of exterior wall 90.

Flashing: In one arrangement, as is shown, teeth 91 are configured to be used with corresponding flashing 202. Flashing 202 is formed of any suitable size, shape and design and is configured to be used with feet 44 having teeth 91 and helps to provide increased engagement, resistance, grip and/or traction between feet 44 and elevated floor 20. In one arrangement, as one example, teeth 91 of feet 44 mesh or engage or mate with similarly shaped features 200 in an upper surface 204 of flashing 202. That is, in one arrangement, a strip of flashing 202 is positioned as the outward edge of elevated floor 20. This flashing 202 is placed at the intersection of elevated floor 20 and sidewall 16 of grain bin 12. Said another way, flashing 202 is placed as a ring around the outer edge of the elevated floor 20 just inside of sidewall 16. In this way, flashing 202 forms a portion of the elevated floor 20 that sweep wheel 38 travels over as sweep auger system 10 rotates around pivot point 28. The meshing, matching or mating features of flashing 202 and teeth 91 of feet 44 facilitate increased friction and drive of sweep wheel 38 which facilitates improved rotation of sweep auger system 10 around pivot point 28.

In one arrangement, as is shown, the strip of flashing 202 that extends around the grain bin 12 just inside sidewall 16 is formed of a plurality of panels that are connected together. In one arrangement, each panel of flashing 202 which forms a ring around grain bin 12 is a generally flat member that extends from an inward edge 206 to an outward edge 208, and extends between opposing sides 210, however any other shape is hereby contemplated for use. In one arrangement, a flange 212 extends upward a distance at the outward edge 208 of flashing 202. In one arrangement, flange 212 extends upward from outward edge 208 and is used to attach to the interior surface of sidewall 16 of grain bin 12. This flange 212 also helps to define the outward edge of the path of sweep auger system 10 as it rotates around pivot point 28, and in this way flange 212 serves to provide some protection to the interior surface of sidewall 16 and guidance for sweep auger system 10. In an alternative arrangement, flanges extend downward from the outward edge 208, inward edge 206, and/or sides 210 and facilitate connection to supports positioned under the elevated floor 20 and/or connection to flanges of other panels of flashing 202 or other components of elevated floor 20. Flashing 202 may take on any other shape and may include any other features that facilitate use of flashing 202 as part of or in association with elevated floor 20.

All or a portion of the upper surface of flashing 202 between inward edge 206 may include a pattern of features 200. In one arrangement, as is shown, when viewed from the side, along the axis of rotation of drive shaft 30, features 200 are triangular in shape or angled in shape with the valleys of each feature 200 connecting to adjacent features 200 in a continuous manner. That is, in this arrangement, features 200 have a pair of flat (however curved is also contemplated) planar faces that angle away from the plane formed by flashing 202 and toward one another to form a peak that rises above the plane of flashing 202. In the arrangement shown, both sides of the peak of features 200 are equal, thereby forming a series of isosceles triangles. In one arrangement, the plurality of features 200 are similarly or identically shaped to one another thereby forming a series of similar or identical peaks and valleys that extend in a continuous manner across the upper surface 204 of flashing 202 from side 210 to side 210. In the arrangement shown, these features 200 also extend all or a portion of the distance from inward edge 206 to outward edge 208. In the arrangement shown, the length of each feature 200 extends perpendicular to the direction of travel of sweep wheel 38, or, said another way; the length of each feature 200 extends in parallel relation to the sides 210 of flashing 202 and perpendicular to the inward edge 206 and outward edge 208 of flashing 202.

The strip of flashing 202 that extends around the periphery of elevated floor 20 just inside of sidewall 16 is formed, manufactured and assembled in any manner. In one arrangement, strip of flashing 202 is formed of a plurality of panels of flashing 202 that are positioned in side 210 to side 210 alignment which are connected to one another and/or to the interior surface of sidewall 16 and/or to other components of elevated floor 20, such as planks 214. In one arrangement, flashing 202 is placed on top of and in addition to elevated floor 20. In another arrangement, flashing 202 is formed as part of elevated floor 20 and is integrated within the planks 214 and other components of elevated floor 20.

In one arrangement, to facilitate air flow through flashing 202, flashing includes a plurality of perforations 216 therein. Perforations 216 are formed of any suitable size, shape and design and are configured to allow air to pass through flashing 202. In one arrangement, perforations 216 are elongated slots or openings that extend laterally in parallel spaced relation with the length of the peaks of features 200. In one arrangement, perforations 216 are positioned between the peak and valley of each feature 200, on the side of the peak opposite the direction of travel. As feet 44 rotate around drive shaft 30, the meshing of teeth 91 with features 200 help to drive sweep auger system 10 around pivot point 28. By positioning perforations 216 on the side of feature 200 opposite the direction of travel, this helps to limit the amount of particles that are forced through the perforations 216 by interaction between teeth 91 of feet 44 and features 200. This is because the push-off that occurs between teeth 91 of feet 44 and features 200 largely occurs on the side of feature 200 in the direction of travel. As such, by placing the perforation 216 on the side of feature 200 opposite the direction of travel essentially places the perforation 216 in the lee of this movement and interaction. In an alternative arrangement, perforations 216 are placed in any other part of flashing 202, such as the valley, the peak, or on any other part of features 200 and/or flashing 202. In an alternative arrangement, perforations 216 are placed in any other arrangement or orientation on flashing 202.

Notably, the push-off that occurs between teeth 91 of feet 44 and features 200 provides the benefit that feet 44 can be formed of a harder and more durable material. This is because the pushing action that occurs between the surfaces of teeth 91 of feet 44 and features 200 reduces the importance of the coefficient of friction of the material used to form feet 44. This allows feet to be formed of a material that is harder (that imparts less friction, because less friction is needed) and more durable. As such, this arrangement makes the sweep wheel 38 and feet 44 last longer.

In one arrangement, instead of features 200 being placed in the upper surface 204 of panels of flashing 202, features 200 are formed in the upper surface of elevated floor 20 in the area adjacent the outward edge of elevated floor 20 and just inside of sidewall 16. This arrangement eliminates the need for using separate flashing 202 components in association with elevated floor 20.

In one arrangement, features 200 start from just inside or adjacent the interior surface of sidewall 16 and extend a length therefrom anywhere from a few inches to a few feet. In one arrangement, features 200 extend from adjacent the interior surface of sidewall 16 inward anywhere from six inches to twenty four inches, or more, however any other length or range is hereby contemplated for use.

In operation, when sweep wheel 38 having feet 44 with teeth 91 is used in association with an elevated floor 20 having mating or matching features 200, as the sweep wheel 38 rotates, grain is moved rearward until the grain is cleared away. Once the grain is cleared away from the path of the rotating sweep wheel 38, feet 44 of sweep wheel 38 engage the upper surface 204 of flashing 202. When feet 44 of sweep wheel 38 engage the upper surface 204 of flashing 202, the teeth 91 of feet 44 mesh with the features 200 of flashing 202 thereby providing increased friction, grip, traction and/or engagement, thereby providing increased drive causing the sweep auger system 10 to rotate around pivot point 28. In this way, the use of feet 44 having teeth 91 in association with matching features 200 in elevated floor 20 improves the performance of sweep auger system 10.

From the above discussion it will be appreciated that the sweep auger system for cleaning grain out of a grain bin presented herein improves upon the state of the art.

Specifically, the sweep auger system for cleaning grain out of a grain bin presented herein: reduces the amount of grain left behind by a sweep auger; reduces the amount of manual labor required to clean a grain bin; works effectively; is efficient; is easy to assemble; is robust; has a long useful life; does not negatively affect the sweep auger's ability to drive around the grain bin; is durable; is relatively inexpensive; is high quality; can be used with practically any grain bin; reduces the number of passes a sweep auger must make in order to empty a grain bin; makes it easier to handle grain, among countless other advantages and improvements.

It will be appreciated by those skilled in the art that other various modifications could be made to the device without parting from the spirit and scope of this invention. All such modifications and changes fall within the scope of the claims and are intended to be covered thereby.

What is claimed:

1. A system for unloading grain out of a grain bin, comprising:
   a sweep;
   the sweep extending a length from an inward end to an outward end;
   the sweep having a forward side and a rearward side;
   a gearbox;
   the gearbox positioned adjacent the outward end of the sweep;
   a wheel;
   the wheel positioned adjacent the outward end of the sweep;
   a drive shield;
   the drive shield positioned adjacent the outward end of the sweep;
   wherein the drive shield forms a pocket;
   wherein the drive shield has a shape such that grain moved within the pocket by rotation of the wheel is directed into a path of the sweep; and
   wherein the drive shield includes an inner side wall that extends forward and inward at an angle relative to the length of the sweep.

2. The system of claim 1, wherein the drive shield includes a back wall that extends approximately parallel to the length of the sweep.

3. The system of claim 1, wherein the drive shield includes an outer side wall that extends approximately perpendicular to the length of the sweep.

4. The system of claim 1, wherein the drive shield is formed of an inner portion and an outer portion that are connected together to form the drive shield.

5. The system of claim 1, wherein:
   the sweep has a drive shaft with flighting extending around the drive shaft; and
   the sweep has a backboard positioned rearward of the drive shaft.

6. The system of claim 1,
   wherein the sweep has a drive shaft; and
   wherein the gearbox operably connects the drive shaft with the wheel.

7. The system of claim 1, wherein the sweep has a drive shaft with flighting extending around the drive shaft; and
   wherein the gearbox operably connects the drive shaft with the wheel.

8. The system of claim 1, wherein the gearbox is positioned at least partially within the pocket of the drive shield.

9. The system of claim 1, wherein the sweep is an auger sweep.

10. A system for unloading grain out of a grain bin, comprising:
    a sweep;
    the sweep extending a length from an inward end to an outward end;
    the sweep having a forward side and a rearward side;
    a gearbox;
    the gearbox positioned adjacent the outward end of the sweep;
    a wheel;
    the wheel positioned adjacent the outward end of the sweep;
    a drive shield;
    the drive shield positioned adjacent the outward end of the sweep;
    wherein the drive shield forms a pocket;
    wherein the drive shield has a shape such that grain moved within the pocket by rotation of the wheel is directed into a path of the sweep;
    wherein the drive shield includes an outer side wall;
    wherein the position of the outer side wall is adjustable.

11. A system for unloading grain out of a grain bin, comprising:
    a sweep;
    the sweep extending a length from an inward end to an outward end;
    the sweep having a forward side and a rearward side;
    a gearbox;
    the gearbox positioned adjacent the outward end of the sweep;
    a wheel;
    the wheel positioned adjacent the outward end of the sweep;
    a drive shield;
    the drive shield positioned adjacent the outward end of the sweep;
    wherein the drive shield forms a pocket;
    wherein the drive shield has a shape such that grain moved within the pocket by rotation of the wheel is directed into a path of the sweep;
    wherein the drive shield includes an outer side wall;
    wherein the outer side wall is configured to operably connect to a back wall of the drive shield at a plurality of different positions to facilitate lateral adjustment of the outer side wall.

12. A system for unloading grain out of a grain bin, comprising:
    a sweep;
    the sweep extending a length from an inward end to an outward end;
    the sweep having a forward side and a rearward side;
    a gearbox;
    the gearbox positioned adjacent the outward end of the sweep;
    a wheel;
    the wheel positioned adjacent the outward end of the sweep;
    a drive shield;

the drive shield positioned adjacent the outward end of the sweep;

wherein the drive shield forms a pocket;

wherein the drive shield has a shape such that grain moved within the pocket by rotation of the wheel is directed into a path of the sweep;

wherein the drive shield includes an outer side wall;

wherein the outer side wall is configured to operably connect at an infinite number of positions between an inner most position and an outer most position.

13. A system for unloading grain out of a grain bin, comprising:

a sweep;

the sweep extending a length from an inward end to an outward end;

the sweep having a forward side and a rearward side;

a wheel;

the wheel positioned adjacent the outward end of the sweep;

a drive shield;

the drive shield positioned adjacent the outward end of the sweep;

wherein the drive shield forms a pocket;

wherein the drive shield has a shape such that grain moved within the pocket by rotation of the wheel is directed into a path of the sweep;

wherein the drive shield includes an outer side wall;

wherein the drive shield includes an inner side wall;

wherein the outer side wall extends forward at a first angle relative to the length of the sweep;

wherein the inner side wall extends forward at a second angle relative to the length of the sweep;

wherein the first angle is different from the second angle.

14. The system of claim 13, wherein the first angle and the second angle differ by 20 degrees or more.

15. The system of claim 13, wherein the inner side wall extends forward and inward from a rear end of the pocket.

16. The system of claim 13, wherein the inner side wall includes a first portion that extends forward at the second angle;

wherein the inner side wall includes a second portion that extends forward from the first portion at a third angle;

wherein the third angle is different from the second angle.

\* \* \* \* \*